US010050922B2

(12) United States Patent
Takahashi et al.

(10) Patent No.: US 10,050,922 B2
(45) Date of Patent: Aug. 14, 2018

(54) SERVER AND METHOD FOR PROCESSING EMAIL MESSAGES

(71) Applicant: FUJITSU LIMITED, Kawasaki-shi, Kanagawa (JP)

(72) Inventors: Hiroaki Takahashi, Yokohama (JP); Michio Masuno, Yokohama (JP); Hiroki Katoh, Kawasaki (JP); Kazuhiro Hayashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 246 days.

(21) Appl. No.: 15/066,031

(22) Filed: Mar. 10, 2016

(65) Prior Publication Data
US 2016/0285811 A1 Sep. 29, 2016

(30) Foreign Application Priority Data
Mar. 25, 2015 (JP) .................................. 2015-062661

(51) Int. Cl.
*H04L 12/58* (2006.01)
*H04L 29/06* (2006.01)

(52) U.S. Cl.
CPC .............. *H04L 51/22* (2013.01); *H04L 51/26* (2013.01); *H04L 63/145* (2013.01); *H04L 63/1483* (2013.01)

(58) Field of Classification Search
CPC ....... H04L 51/22; H04L 51/26; H04L 63/145; H04L 63/1483
See application file for complete search history.

(56) References Cited

U.S. PATENT DOCUMENTS

| 2009/0132662 | A1* | 5/2009 | Sheridan | G06Q 10/107 709/206 |
| 2016/0110528 | A1* | 4/2016 | Gupta | G06F 21/31 726/19 |
| 2016/0277344 | A1* | 9/2016 | Patukale | H04L 51/12 |
| 2017/0005954 | A1* | 1/2017 | Shaltiel | H04L 51/02 |

FOREIGN PATENT DOCUMENTS

| JP | 2007-202046 | 8/2007 |
| JP | 2008-283380 | 11/2008 |
| JP | 2009-14440 | 1/2009 |

* cited by examiner

*Primary Examiner* — Alina A Boutah
(74) *Attorney, Agent, or Firm* — Fujitsu Patent Center

(57) ABSTRACT

A mail processing server includes a storage unit and a computation unit. The storage unit stores operation log data recording operations that a plurality of users performed on received email messages. Upon detection of a target email message addressed to a plurality of destination users, the computation unit produces priority data that describes priorities of individual destination users specified in the target email message, based on the operation log data in the storage unit.

7 Claims, 24 Drawing Sheets

FIG. 5

MAIL EXECUTION HISTORY DATABASE — 120

121 ACTION MANAGEMENT TABLE

| ID | Actor | Reception Timestamp | Execution Timestamp | Subject Keyword | Source | Destination | Execution Type | Action Pattern Flag |
|---|---|---|---|---|---|---|---|---|
| 1 | AAA | 2014-11-10 (Mon) 13:52:04 | 2014-11-10 (Mon) 14:20:03 | serious | BBB@jp.xxx.com | To: AAA@jp.xxx.com | pdf | Done |
| 2 | AAA | 2014-11-10 (Mon) 15:24:38 | 2014-11-10 (Mon) 08:53:20 | - | CCC@jp.xxx.com | To: ML@jp.xxx.com | URL | Done |
| 3 | AAA | 2014-11-11 (Tue) 09:32:26 | 2014-11-12 (Wed) 08:56:04 | - | sys@jp.xxx.com | To: AAA@jp.xxx.com | doc | Done |
| 4 | AAA | 2014-11-11 (Tue) 12:02:01 | 2014-11-11 (Tue) 12:06:04 | urgent | DDD@jp.xxx.com | To: AAA@jp.xxx.com | pdf | Pending |
| 5 | BBB | 2014-11-12 (Wed) 13:32:19 | 2014-11-12 (Wed) 15:32:41 | - | EEE@jp.xxx.com | Cc: ML@jp.xxx.com | exe | Pending |
| 6 | BBB | 2014-11-12 (Wed) 15:45:40 | 2014-11-12 (Wed) 17:09:29 | - | FFF@jp.xxx.com | Cc: BBB@jp.xxx.com | pdf | Pending |
| ... | ... | ... | ... | ... | ... | ... | ... | ... |

ELAPSED-TIME-BASED SUMMARY

141a OVERALL MANAGEMENT TABLE

| First 5 min | 5 to 60 min | Over 60 min | Ratio of First 5 min |
|---|---|---|---|
| 100 | 200 | 120 | 0.24 |

141b KEYWORD-SPECIFIC MANAGEMENT TABLE

| Keyword | First 5 min | 5 to 60 min | Over 60 min | Ratio of First 5 min |
|---|---|---|---|---|
| urgent | 5 | 3 | 0 | 0.63 |
| serious | 8 | 2 | 3 | 0.62 |
| action required | 10 | 20 | 15 | 0.22 |
| report | 2 | 12 | 18 | 0.06 |

141c TYPE-SPECIFIC MANAGEMENT TABLE

| Execution Type | First 5 min | 5 to 60 min | Over 60 min | Ratio of First 5 min |
|---|---|---|---|---|
| exe | 0 | 2 | 10 | 0.00 |
| pdf | 3 | 20 | 10 | 0.09 |
| doc | 10 | 6 | 8 | 0.42 |
| xls | 2 | 12 | 24 | 0.05 |
| URL | 10 | 8 | 6 | 0.42 |

141d SOURCE-SPECIFIC MANAGEMENT TABLE

| Source Address | First 5 min | 5 to 60 min | Over 60 min | Ratio of First 5 min |
|---|---|---|---|---|
| inside | 30 | 20 | 50 | 0.30 |
| outside | 10 | 15 | 12 | 0.27 |

141e DESTINATION-SPECIFIC MANAGEMENT TABLE

| Destination Address | First 5 min | 5 to 60 min | Over 60 min | Ratio of First 5 min |
|---|---|---|---|---|
| To individual | 8 | 3 | 2 | 0.62 |
| CC individual | 12 | 23 | 20 | 0.22 |
| To list | 4 | 35 | 12 | 0.08 |
| CC list | 1 | 20 | 32 | 0.02 |

CALENDAR-TIME-BASED SUMMARY

141f  TIME-OF-DAY EXECUTION RATIO MANAGEMENT TABLE

| Time of Day | Execution Count | Execution Ratio |
|---|---|---|
| 00:00 to 01:00 | 0 | 0.00 |
| 01:00 to 02:00 | 0 | 0.00 |
| ... | ... | ... |
| 09:00 to 10:00 | 6 | 0.13 |
| 10:00 to 11:00 | 3 | 0.06 |
| ... | ... | ... |
| 23:00 to 24:00 | 1 | 0.02 |
| Total | 48 | |

141g  DAY-OF-WEEK EXECUTION RATIO MANAGEMENT TABLE

| Day of Week | Execution Count | Execution Ratio |
|---|---|---|
| Monday | 35 | 0.17 |
| Tuesday | 21 | 0.10 |
| ... | ... | ... |
| Sunday | 0 | 0.00 |
| Total | 210 | |

141h  DAY-OF-MONTH EXECUTION RATIO MANAGEMENT TABLE

| Day of Month | Execution Count | Execution Ratio |
|---|---|---|
| 1 | 40 | 0.05 |
| 2 | 20 | 0.02 |
| ... | ... | ... |
| 30 | 8 | 0.01 |
| Total | 900 | |

FIG. 9

72 FRAUDULENT EMAIL DETECTION RECORD

| Message ID | Reception Date | Reception Time | Subject Keyword | Source Address | Destination Address | Execution Type |
|---|---|---|---|---|---|---|
| 487DE8@JP | 2014-11-13 (Thu) | 10:24:04 | serious | BBB@jp.xxx.com | To:AAA@jp.xxx.com | pdf |

FIG. 22

| Recipient | Ratio of "00:00 to 01:00" | Ratio of "important" | Ratio of "From Outside" | Risk Level |
|---|---|---|---|---|
| A | 0.1 | 0.8 | 0.1 | 0.008 |
| B | 0.1 | 0.4 | 0.2 | 0.008 |
| C | 0.2 | 0.2 | 0.2 | 0.008 |

| No | Subject "important" | From Outside | First 5 min |
|---|---|---|---|
| 1 | Yes | No | No |
| 2 | Yes | No | No |
| 3 | Yes | No | No |
| 4 | Yes | Yes | Yes |
| 5 | Yes | Yes | No |
| 6 | No | Yes | No |
| 7 | No | Yes | No |
| 8 | No | Yes | No |

In records with
  Subject "important" =YES
  & From Outside =YES,
Ratio of First 5-min Actions
  = 1/2 (0.5)

| Rank | User | Execution ratio in first five minutes after reception of email with "important" subject |
|---|---|---|
| 1 | tanaka | 0.90 |
| 2 | sato | 0.88 |
| 3 | yamada | 0.87 |
| ⋮ | ⋮ | ⋮ |
| 99 | watanabe | 0.08 |
| 100 | suzuki | 0.05 |

SERVER AND METHOD FOR PROCESSING EMAIL MESSAGES

CROSS-REFERENCE TO RELATED APPLICATION

This application is based upon and claims the benefit of priority of the prior Japanese Patent Application No. 2015-062661, filed on Mar. 25, 2015, the entire contents of which are incorporated herein by reference.

FIELD

The embodiments discussed herein relate to a server and method for processing email messages.

BACKGROUND

Electronic mail (email) has been used to transmit messages from an author to one or more recipients over computer networks. As the email communication becomes popular, more and more malicious email messages targeted at individuals are transmitted, thus causing an increased amount of damage at the receiving end. These messages are called "fraudulent email." A fraudulent email message may use "spoofing" to make the message appear to be sent from a known source, and its content is forged so that the recipient would open it as a business-related message. The sender intends to mislead the recipient into believing that the message is legitimate and credible and thus opening attached files or visiting a web page created for malicious purposes. The following description will use the term "risky actions" to refer to actions such as opening an attached file, and selecting a link in the message body and thus visiting a web page indicated by that link.

Some existing email systems run a process for early detection of fraudulent messages and quick countermeasures against them. This process opens an attached file in an isolated environment for its behavioral analysis. If the attached file causes something risky in terms of computer security, the email message carrying that file is marked fraudulent. The detected fraudulent message is deleted by its pertinent mail server, thus preventing the recipients from doing a risky action with the message.

As an example of countermeasures against fraudulent email, a technique is proposed for preventing access to malicious sites. According to this technique, a received email message is checked to detect a link containing a destination address of a suspicious site. The detected link is rewritten to the address of an access warning device so that the user will receive a warning message against risky access upon selection of the link. See, for example, the following document:

Japanese Laid-open Patent Publication No. 2007-202046

SUMMARY

In one aspect, there is provided a mail processing server including a memory configured to store operation log data recording operations that a plurality of users performed on received email messages; and a processor configured to perform a procedure including: producing, upon detection of a target email message addressed to a plurality of destination users, priority data that describes priorities of individual destination users specified in the target email message, based on the operation log data in the memory.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an example of a mail execution history database;

FIG. 7 illustrates an example of an elapsed-time-based summary;

FIG. 8 illustrates an example of a calendar-time-based summary;

FIG. 9 illustrates an example of a fraudulent email detection record;

FIG. 22 illustrates a drawback of using the product of all risk levels of different aspects;

DESCRIPTION OF EMBODIMENTS

It takes a long time to remove all messages from user mailboxes particularly in the case that they are addressed to many users. During that time, recipients may download their messages from the mail server and conduct risky actions such as opening attached files. Some of these recipients tend to do such actions in a short time after the email reception, while others do not. Actually the time length from reception to risky action may vary from user to user.

In view of the above, it would be reasonable to delete in the first place fraudulent email addressed to users who tend to open attached files in a short time. The existing systems, however, lack the capability of estimating the time the individual users would spend before opening an attached file of a received email message, thus being unable to deal with fraudulent messages in the right order.

Several embodiments will be described below with reference to the accompanying drawings. These embodiments may be combined with each other, unless they have contradictory features.

(a) First Embodiment

Figure 1:
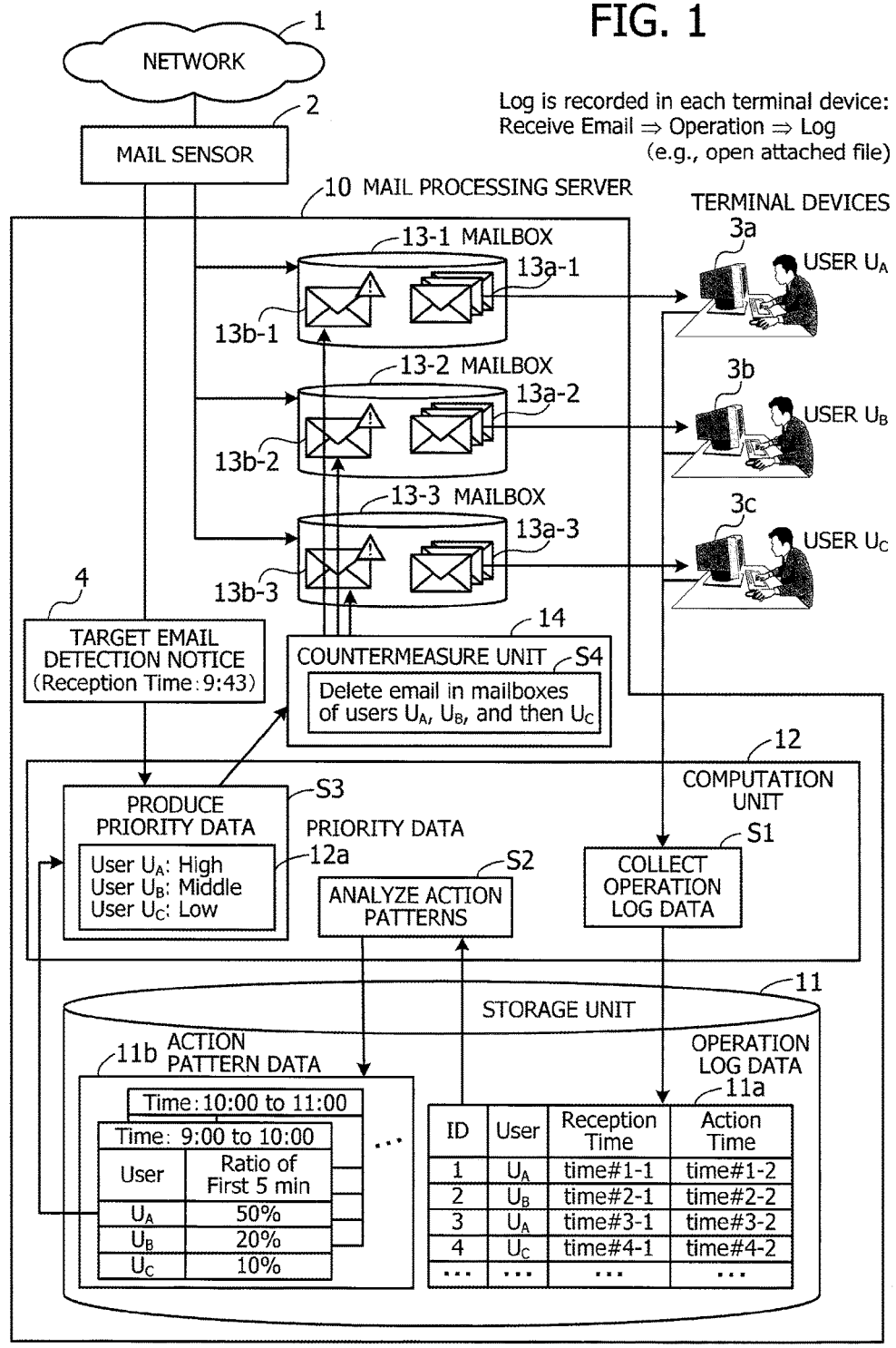
FIG. 1 illustrates an example of a system configuration according to a first embodiment.

FIG. 1 illustrates an example of a system configuration according to a first embodiment. The illustrated system includes a mail processing server 10 that manages email messages received from a network 1 via a mail sensor 2. Each received message goes to one or more mailboxes 13-1 to 13-3 of individual users, depending on the destination address specified in it. The users may use their respective terminal devices 3a to 3c to download and open email messages from the mailboxes 13-1 to 13-3.

The mail sensor 2 detects target email messages 13b-1 to 13b-3 that need certain countermeasures to avoid their potential risks. For example, the mail sensor 2 checks a received message to detect its possibility of causing some undesired problems and captures such fraudulent messages as target email messages 13b-1 to 13b-3 for countermeasures. Upon detection of a target email message, the mail sensor 2 sends a target email detection notice 4 to the mail processing server 10.

According to the first embodiment, the terminal devices 3a to 3c are configured to record a log of actions that the users take when they receive email. For example, some users may open an attached file of a received message. The terminal devices 3a to 3c detect such actions and produce "action records" of them. For example, each action record may contain the following things: ID of a received email message, a reception timestamp indicating when the message was received, an action timestamp indicating when the receiving user performed an action with regard to the received message, and a user name indicating who executed that action.

The mail processing server 10 takes countermeasures against fraudulent email messages 13b-1 to 13b-3 in the mailboxes 13-1 to 13-3 of individual users. For example, the mail processing server 10 deletes these messages from the mailboxes. This countermeasure has to begin with the mailbox of a user who tends to do a certain action on an email message immediately after its reception. To deal with the fraudulent email messages 13b-1 to 13b-3 in an appropriate order, the mail processing server 10 includes a storage unit 11, a computation unit 12, and a countermeasure unit 14.

The storage unit 11 provides a storage space for operation log data 11a, which records operations that the users did with their received email messages. The storage unit 11 also provides a storage space for action pattern data 11b that describes each user's action pattern. As will be described below, action patterns are obtained by analyzing the operation log data 11a.

The computation unit 12 takes countermeasures against the fraudulent email messages 13b-1 to 13b-3 in an appropriate order based on operation log data that the terminal devices 3a to 3c have recorded. For example, the computation unit 12 collects operation log data from the terminal devices 3a to 3c and stores the collected data in the storage unit 11 (step S1). The computation unit 12 then analyzes action patterns of individual users on the basis of the operation log data 11a in the storage unit 11 (step S2). For example, the computation unit 12 divides a day into a plurality of time ranges and calculates the ratio of actions that an individual user performed on received email messages in each time range, with a certain degree of promptness (e.g., in the first five minutes after reception of email). The computation unit 12 stores the result of this action pattern analysis in the storage unit 11 as action pattern data 11b.

The computation unit 12 also produces priority data 12a from the operation log data 11a upon detection of target email messages 13b-1 to 13b-3 (step S3). This priority data 12a describes priority of each destination user of the target email messages 13b-1 to 13b-3, namely, in what order of destination users to deal with their received messages. It is assumed in FIG. 1 that a set of action pattern data 11b has been ready in the storage unit 11 as a result of a previous analysis of the operation log data 11a. The computation unit 12 is therefore able to quickly determine the priority of each destination user when target email messages 13b-1 to 13b-3 are detected. For example, the computation unit 12 gives higher priorities to destination users who tend to take action with regard to their received email messages 13a-1 to 13a-3 in a shorter time.

The countermeasure unit 14 conducts countermeasures against the target email messages 13b-1 to 13b-3 upon production of the priority data 12a, sequentially from destination users with the highest priority to those with the lowest priority (step S4). For example, the countermeasure unit 14 deletes the target email messages 13b-1 to 13b-3 from their mailboxes 13-1 to 13-3 in descending order of the user priority. Another example of countermeasures is to send a warning message to each user's terminal device 3a to 3c to indicate detection of target email messages 13b-1 to 13b-3 suspected to be fraudulent.

The countermeasure unit 14 may also investigate whether the detected target email messages 13b-1 to 13b-3 have already been downloaded to terminal devices 3a to 3c of their destination users. When a downloaded message is found, the countermeasure unit 14 may request the pertinent terminal device 3a to 3c to delete that message.

In operation of the above-described system, the terminal devices 3a to 3c accumulate records of what the users have done with regard to their received email messages 13a-1 to 13a-3. The resulting operation log data 11a is collected by the mail processing server 10 and stored in its local storage unit 11. Then based on this operation log data 11a in the storage unit 11, the computation unit 12 analyzes how the users acted on received email messages, thus recognizing particular action patterns of the individual users. For example, the computation unit 12 calculates the ratio of specific actions performed on received email messages within a five-minute period after their reception. The computation unit 12 calculates this ratio for each individual user, as well as for each divided time range of a day, and stores the analysis result into the storage unit 11 as action pattern data 11b.

Fraudulent email messages 13b-1 to 13b-3 arrive later at the mailboxes 13-1 to 13-3 of all or some of those users. The mail sensor 2 detects that the received email messages 13b-1 to 13b-3 are fraudulent. Upon detection, the mail sensor 2 sends a target email detection notice 4 to the mail processing server 10.

In response to the target email detection notice 4, the mail processing server 10 consults the action pattern data 11b to determine the priority order for countermeasures against the fraudulent email messages 13b-1 to 13b-3. Suppose, for example, that the fraudulent email messages 13b-1 to 13b-3 have a reception timestamp of "9:43." The computation unit 12 then consults the action pattern data 11b of relevant users and extracts their action patterns in the time range "9:00 to 10:00" that the reception timestamp "9:43" falls in. In the example seen in FIG. 1, the action pattern of user $U_A$ indicates that 50% of email messages underwent a specific action within the first five-minute period after their respective reception times in that time range. In contrast to this, the ratio of user $U_B$ in the same conditions is 20%, and that of user $U_C$ is only 10%.

The illustrated action pattern data 11b thus suggests a particularly high degree of urgency for taking countermeasures against the fraudulent email message 13b-1 addressed to user $U_A$. The second to the highest degree is found in the fraudulent email message 13b-2 addressed to user $U_B$. In contrast, a relatively low urgency is suggested for the fraudulent email message 13b-3 addressed to user $U_C$. The mail processing server 10 thus determines that the countermeasures be directed to users $U_A$, $U_B$, and $U_C$ in that order.

According to the above determination, the mail processing server 10 now removes one fraudulent email message 13b-1 from the mailbox 13-1 of user $U_A$ in the first place, and then another fraudulent email message 13b-2 from the mailbox 13-2 of user $U_B$. Lastly, the mail processing server 10 removes yet another fraudulent email message 13b-3 from the mailbox 13-3 of user $U_C$.

As can be seen from the above description, the proposed mail processing server 10 deals with received fraudulent email messages in the order of destination users' tendency toward risky actions such as opening attached files in a shorter time after their email reception. This means that the fraudulent email messages are deleted from mailboxes in an appropriate order before the users may run an unwanted program embedded in an attachment file.

The operation log data 11a may be configured to store some characteristic properties of email messages 13a-1 to 13a-3, such as their reception timestamps, type of file attachment, and source indication (i.e., whether the sender is inside or outside the recipient's organization). When this is the case, the computation unit 12 uses a specific property of a target email message (e.g., fraudulent email messages 13b-1 to 13b-3) to extract relevant records from each user's operation log data, such that the extracted records of email messages are similar to the target email message in that specific property. The computation unit 12 determines priorities of users from these extracted records. For example, the computation unit 12 gives a higher priority to a user when he or she has a tendency toward risky actions on email messages that are similar to the fraudulent email messages 13b-1 to 13b-3 at hand. The computation unit 12 can therefore determine the urgency of countermeasures more properly, thus reducing the chance for the received email massages to cause undesired things.

It is also possible to extract two or more characteristic properties from a target email message. In this case, the computation unit 12 calculates on the basis of the operation log data 11a an execution ratio of risky actions taken in a certain amount of time after email reception. This execution ratio is calculated for each destination user, as well as with respect to each different email property. The computation unit 12 then determines the priorities of users on the basis of multiple execution ratios calculated for different properties.

For example, a plurality of execution ratios are calculated for a single user in terms of different email properties, and the user's priority is determined by multiplying all those execution ratios together. The computation unit 12 can evaluate the urgency for countermeasures more properly with email properties, thus reducing the possibility of undesired things.

For example, the above-described computation unit 12 and countermeasure unit 14 may be implemented as part of the functions performed by a processor in the mail processing server 10. The storage unit 11 may be implemented as part of a memory device in the mail processing server 10. It is noted that the lines interconnecting the functional blocks in FIG. 1 represent some of their communication paths. The person skilled in the art would appreciate that there may be other communication paths in actual implementations.

(b) Second Embodiment

This section describes a second embodiment, which determines the priority of each email user on the basis of detected fraudulent email messages and deletes those messages from relevant mailboxes in descending order of the determined priorities. Note that the description uses the terms "electric mail," "email," and "mail" interchangeably.

Figure 2:
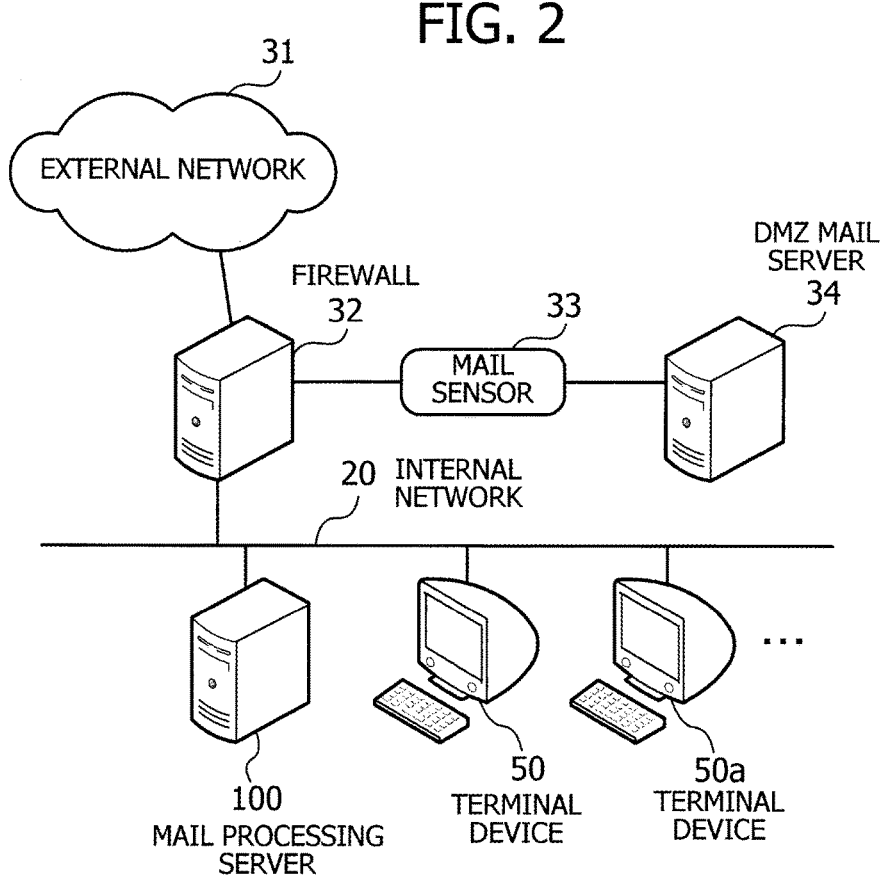
FIG. 2 illustrates an example of a system configuration according to a second embodiment.

FIG. 2 illustrates an example of a system configuration according to the second embodiment. The illustrated system includes an internal network 20 and an external network 31 connected via a firewall 32. The external network 31 may be, for example, the Internet. The internal network 20 may be, for example, a local area network (LAN) of an organization (e.g., company). The firewall 32 is connected to a demilitarized zone (DMZ) mail server 34 via a mail sensor 33 deployed to detect fraudulent email messages.

Other things connected to the internal network 20 are a plurality of terminal device 50, 50a, . . . and a mail processing server 100. The terminal devices 50, 50a, are computers of users, and the mail processing server 100 manages email addressed to the users. For example, the mail processing server 100 may be configured to delete fraudulent email messages upon their detection.

Incoming mail messages from the external network 31 are directed to the firewall 32 before arriving at the DMZ mail server 34. These messages are then transferred from the DMZ mail server 34 to the mail processing server 100. The mail processing server 100 distributes received email messages into mailboxes of individual users. The user of, for example, a terminal device 50 makes access to the mail processing server 100 and downloads email messages addressed to him or her. The terminal device 50 displays the body text of a downloaded message.

When the message body includes a Uniform Resource Locator (URL) link, the user may select that link to visit where the URL points to. That is, the terminal device 50 makes access to a website indicated by the URL, receives web page data from there, and displays a web page on the terminal screen. This web page may include a program embedded therein, and in that case, the terminal device 50 executes it besides displaying the web page.

The downloaded email message may contain a file attachment. When this is the case, the terminal device 50 indicates that fact by displaying a special icon on its screen. This icon, if selected by the user, invokes its corresponding application so as to display the attached file on a screen of the terminal device 50. In the case where a macro program or other executable code is embedded in the attached file, the terminal device 50 runs it upon display of the file content.

Figure 3:
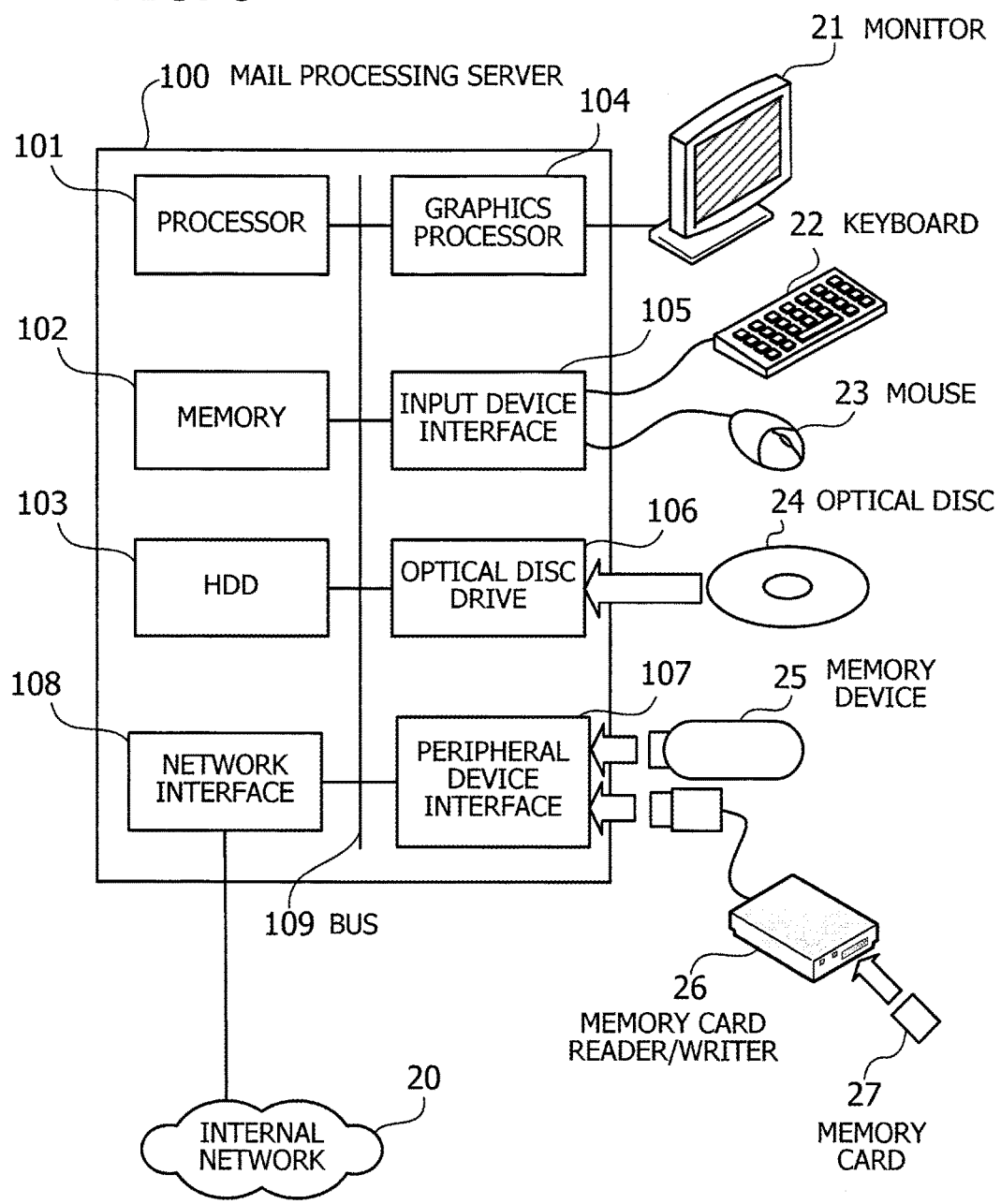
FIG. 3 illustrates an example of a hardware configuration of a mail processing server.

FIG. 3 illustrates an example of a hardware configuration of a mail processing server. The illustrated mail processing server 100 has a processor 101 to control its entire operation. The processor 101 is connected to a memory 102 and other various devices and interfaces on a bus 109. The processor 101 may be a single processing device or a multiprocessor system including two or more processing devices. For example, the processor 101 may be implemented as a central processing unit (CPU), micro processing unit (MPU), or digital signal processor (DSP). It is also possible to implement processing functions of the processor 101 wholly or partly with an application-specific integrated circuit (ASIC), programmable logic device (PLD), or other electronic circuits, or any combination of them.

The memory 102 serves as the primary storage device of the mail processing server 100. Specifically, the memory 102 is used to temporarily store at least some of the operating system (OS) programs and application programs that the processor 101 executes, as well as other various data objects that it manipulates at runtime. For example, the memory 102 may be implemented as a storage space of random access memory (RAM) or other volatile semiconductor memory devices.

Other components connected to the bus 109 are a hard disk drive (HDD) 103, a graphics processor 104, an input device interface 105, an optical disc drive 106, a peripheral device interface 107, and a network interface 108.

The HDD 103 writes and reads data magnetically on its internal platters. The HDD 103 serves as a secondary storage device of the mail processing server 100 to store program and data files of the operating system and applications. Other possible secondary storage devices include Solid State Drives (SSD) using non-volatile flash memory devices.

The graphics processor 104, coupled to a monitor 21, produces video images in accordance with drawing commands from the processor 101 and displays them on a screen of the monitor 21. The monitor 21 may be, for example, a cathode ray tube (CRT) display or a liquid crystal display.

The input device interface 105 is connected to input devices such as a keyboard 22 and a mouse 23 and supplies signals from those devices to the processor 101. The mouse 23 is a pointing device, which may be replaced with other kind of pointing devices, such as touchscreen, tablet, touchpad, and trackball.

The optical disc drive 106 reads out data encoded on an optical disc 24, by using laser light. The optical disc 24 is a portable data storage medium, the data recorded on which can be read as a reflection of light or the lack of the same. The optical disc 24 may be a digital versatile disc (DVD), DVD-RAM, compact disc read-only memory (CD-ROM), CD-Recordable (CD-R), or CD-Rewritable (CD-RW), for example.

The peripheral device interface 107 is a communication interface used to connect peripheral devices to the mail processing server 100. For example, the peripheral device interface 107 may be used to connect a memory device 25 and a memory card reader/writer 26. The memory device 25 is a data storage medium having a capability to communicate with the peripheral device interface 107. The memory card reader/writer 26 is an adapter used to write data to or read data from a memory card 27, which is a data storage medium in the form of a small card.

The network interface 108 is connected to the internal network 20 of FIG. 2 so as to exchange data with other computers or network devices (not illustrated).

The above-described hardware platform may be used to implement the processing functions of the mail processing server 100 described below. Other devices seen in FIG. 2 may also be implemented similarly to the mail processing server 100 of FIG. 3. It is further noted that the same hardware configuration of FIG. 3 may similarly serve for the foregoing mail processing server 10 of the first embodiment.

The mail processing server 100 provides various processing functions of the second embodiment by executing programs stored in a computer-readable storage medium. These processing functions are encoded in the form of computer programs, which may be stored in a variety of media. For example, the mail processing server 100 may store program files in its local HDD 103. The processor 101 reads at least part of program files stored in the HDD 103 and executes programs after loading them on the memory 102. Other possible storage locations for the programs include portable storage media, such as optical discs 24, memory devices 25, and memory cards 27. The programs stored in such a portable storage medium are installed in the HDD 103 under the control of the processor 101, so that they are ready to execute upon request. It may also be possible for the processor 101 to execute program codes read out of a portable storage medium, without installing them in its local storage devices.

The following description will explain how the mail processing server 100 deletes fraudulent messages. Some malicious third party sends fraudulent email messages to users of the present system. Such messages may include, for example, a URL link that is intended to lead the recipient to a website created for malicious purposes. Some other messages may have, for example, a malware program as their file attachment.

Fraudulent email messages are detected by the mail sensor 33 when they arrive from the external network 31. For example, the mail sensor 33 tests and analyzes the behavior of an attached file and determines whether it performs any suspicious activity that could cause information leakage (e.g., send internal data to the outside). The mail sensor 33 has some predefined test criteria for detecting fraudulent email and marks a message fraudulent when it causes a process that matches with the test criteria.

The mail sensor 33, however, needs some amount of time before it concludes that a received email message is fraudulent. An email message may reach the mailboxes of its destination users in the mail processing server 100 while the mail sensor 33 is investigating whether it is fraudulent. The email message may further go to, for example, a terminal device 50 if its user downloads the message from the mail processing server 100. That is, fraudulent email messages may already be in the mail processing server 100 or terminal devices 50, 50a, . . . , when they are detected by the mail sensor 33. Accordingly, the proposed mail processing server 100 invokes a procedure of deleting fraudulent email when such email is detected at the mail sensor 33.

Figure 4:
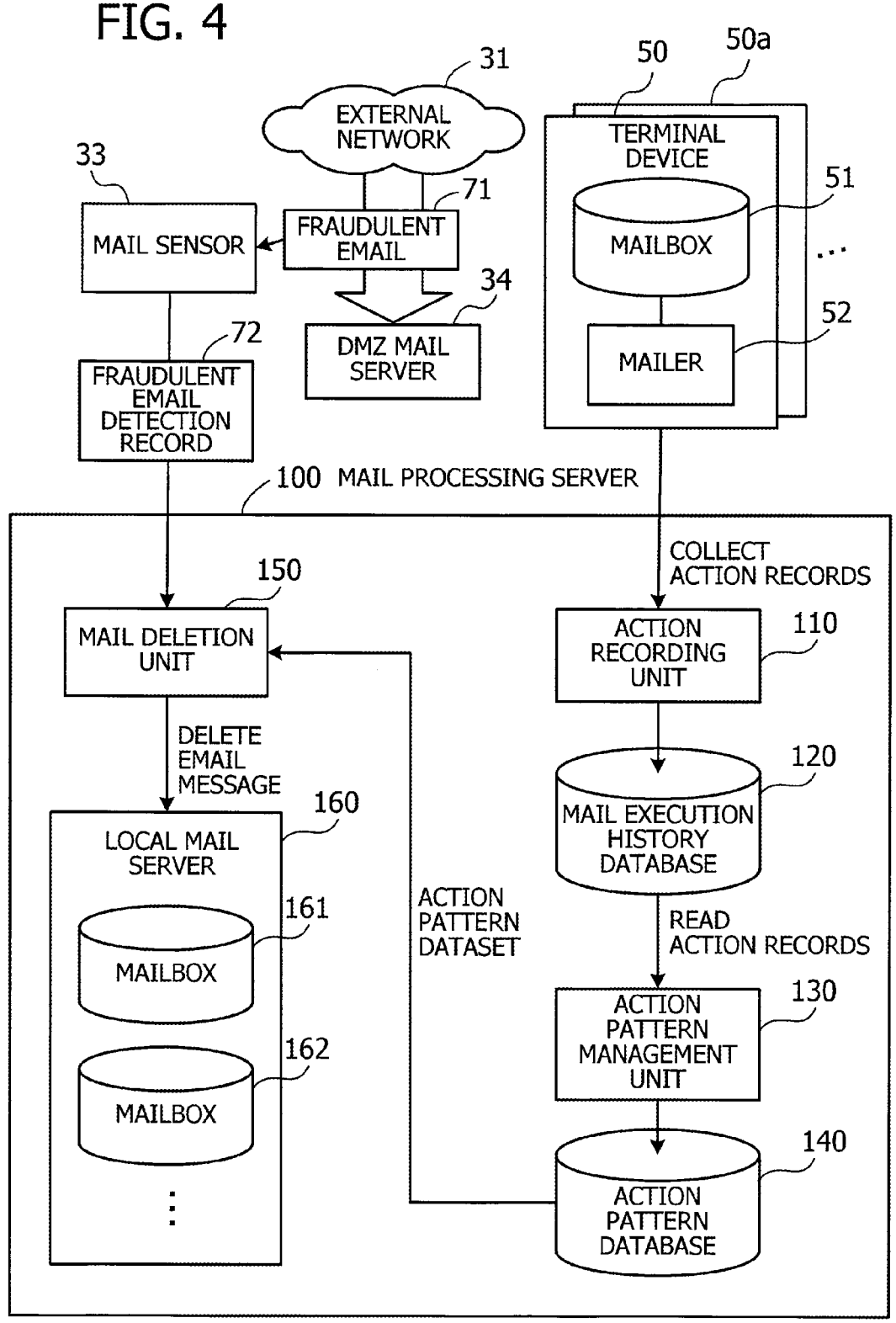
FIG. 4 gives an overview of how to delete fraudulent email.

FIG. 4 gives an overview of how to delete fraudulent email. The illustrated mail processing server 100 includes the following components for processing email messages: an action recording unit 110, a mail execution history database 120, an action pattern management unit 130, an action pattern database 140, a mail deletion unit 150, and a local mail server 160.

The action recording unit 110 collects log records of risky actions that the users performed on their received email messages and accumulates the records in the mail execution history database 120. The term "risky actions" means the act of, for example, opening attached files or selecting URL in the email body to visit a remote web page. Risky actions may further include the act of opening a received message to view its content. As noted above, the mail execution history database 120 is a collection of log records describing the actions each user did with received email messages. Each time a new action record is received from the terminal devices 50, 50a, the action recording unit 110 adds it to the mail execution history database 120, thus forming a history of actions.

The action pattern management unit 130 manages an action pattern database 140 that describes the pattern of actions the users perform upon receipt of email messages. The action pattern database 140 is a collection of action patterns of individual users. For example, the action pattern management unit 130 analyzes each user's action pattern on the basis of action records collected by the action recording unit 110. More specifically, the action pattern management unit 130 quantifies the likeliness of each user's opening an email-attached file, depending on what type of email it is and when it is received.

The mail deletion unit 150 deletes a fraudulent email message from the local mail server 160 in response to a fraudulent email detection record 72 that is received. For example, the mail deletion unit 150 evaluates the urgency of each user on the basis of his or her action pattern stored in the action pattern database 140 and deletes fraudulent email from mailboxes of users in descending order of their urgency.

The local mail server 160 stores and manages email of users. To this end, the local mail server 160 includes a plurality of mailboxes 161, 162, corresponding to individual users. Received messages are sorted into these mailboxes 161, 162, according to their destination addresses.

The terminal device 50 has a mailbox 51 and a mailer 52. The mailbox 51 is a place for storing email messages addressed to the user of the terminal device 50. The mailer 52 downloads email from the local mail server 160 and enters it into the mailbox 51. The mailer 52 is also used to view existing email in the mailbox 51. When the user opens an attached file, the mailer 52 sends an action record to the action recording unit 110 to indicate the file opening action. When the user selects a URL link in the email body, the mailer 52 similarly sends an action record to the action recording unit 110 to indicate the URL selecting action.

In operation of the system formed from the above components, the mail sensor 33 detects a fraudulent email message 71 from the external network 31 to the DMZ mail server 34. This detection causes transmission of a fraudulent email detection record 72 from the mail sensor 33 to the mail deletion unit 150. It is assumed here that the detected message has multiple destination addresses. Upon receipt of the fraudulent email detection record 72, the mail deletion unit 150 retrieves an action pattern dataset of each destination user from the action pattern management unit 130. Based on the retrieved action pattern datasets, the mail deletion unit 150 determines the order of destination users for the purpose of prioritized deletion of the fraudulent email message. For example, the mail deletion unit 150 checks the current time, type of the email in question, and the like and gives a higher priority to a user who tends to do risky actions in a shorter time after email reception. The mail deletion unit 150 then selects users in the order of their priorities and removes the fraudulent email message from their respective mailboxes in the local mail server 160. In the case where the fraudulent email message has already been downloaded to terminal devices 50, 50a, ..., the mail deletion unit 150 may cause the terminal devices to delete such messages by sending them a notice of the detection of fraudulent email.

It is noted that the lines interconnecting the functional blocks in FIG. 4 represent some of their communication paths. The person skilled in the art would appreciate that there may be other communication paths in the actual implementations. It is also noted that the illustrated functional blocks in the mail processing server 100 may be implemented distributedly across different computers. Further, the illustrated functional blocks may be implemented as, for example, separate program modules executed by one or more computers.

The proposed system configuration of the second embodiment has been discussed above in FIGS. 3 and 4. The following description will now turn to more specific structures of data used in the proposed system.

FIG. 5 illustrates an example of a mail execution history database. As an example, the illustrated mail execution history database 120 contains an action management table 121. This action management table 121 is a data table formed from registered entries of action records collected from terminal devices 50, 50a, and so on. Specifically, this action management table 121 has the following data fields: ID, Actor, Reception Timestamp, Execution Timestamp, Subject Keyword, Source, Destination, Execution Type, and Action Pattern Flag.

The ID field contains an identifier that indicates a specific action record collected, and the actor field indicates the name of a user of the mailer that collected the action record. The reception timestamp field contains a text string that indicates when the local mail server 160 received the email message of interest. The execution timestamp field contains a text string that indicates when the user made a risky action on the email message. The subject keyword field contains distinctive keywords (e.g., "serious" and "urgent") found in the subject header field of the email message. The source field contains an email address of the sender of the email message, and the destination field contains an email address of the recipient of the same. The execution type field represents what kind of risky action was performed. For example, an execution type value "pdf" means that the user opened a Portable Document Format (PDF) file. Another execution type value "doc" indicates that the user opened a file with an extension of "doc." Similarly, yet another execution type value "exe" means that the user opened a file with an extension of "exe." Still another execution type value "URL" indicates that the user selected a URL link to a website. The action pattern flag field contains a flag that indicates whether the action record is reflected or not in the action pattern database 140. Specifically, this action pattern flag field takes a value of "Done" to indicate that the action record has already been reflected. Otherwise, the field has a value of "Pending."

Figure 6:
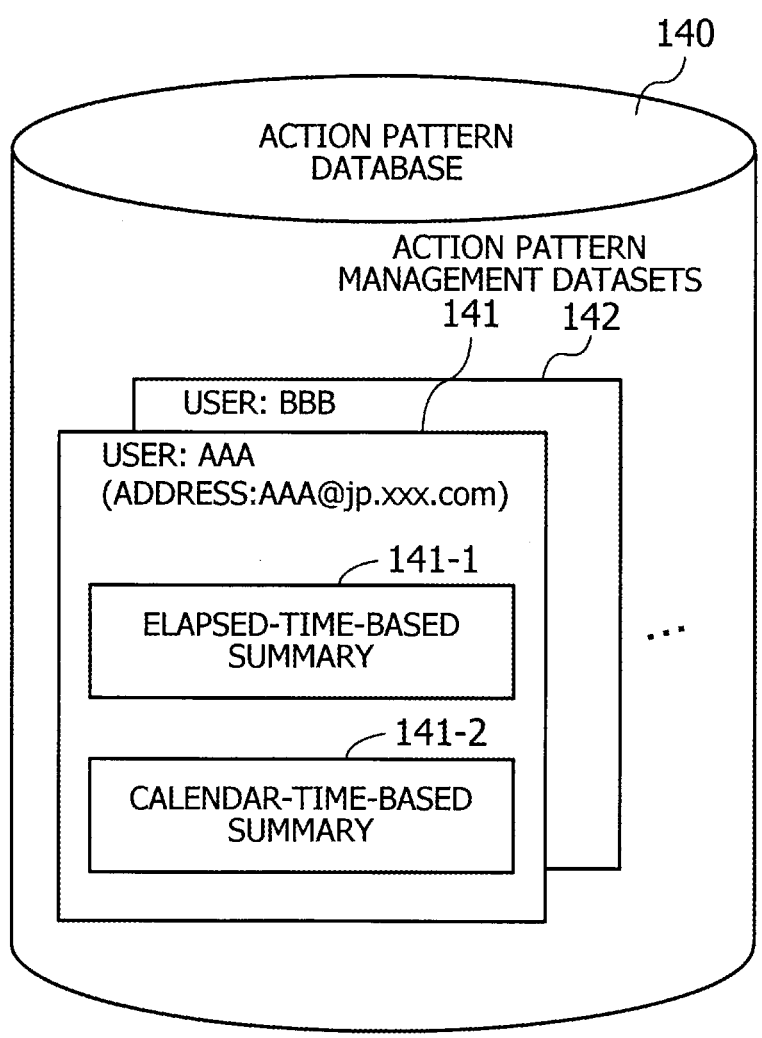
FIG. 6 illustrates an example of an action pattern database.

FIG. 6 illustrates an example of an action pattern database. The illustrated action pattern database 140 contains a plurality of user-specific action pattern management datasets 141, 142, and so on. Each action pattern management dataset 141, 142, and so on is labeled with the corresponding user's email address.

The action pattern management datasets 141, 142, and so on describe what kind of risky actions the users tend to take and in what situations these actions are likely to be taken. Referring to, for example, one action pattern management dataset 141, it includes an elapsed-time-based summary 141-1 and a calendar-time-based summary 141-2. The elapsed-time-based summary 141-1 gives a set of summarized statistics of risky actions performed with the elapsed time after the reception of email. The calendar-time-based summary 142-1 gives another set of summarized statistics of risky actions viewed from a different point, such as when in a day or a week or a month the user tends to take risky actions.

FIG. 7 illustrates an example of an elapsed-time-based summary. The elapsed-time-based summary 141-1 is actually formed from an overall management table 141a, a keyword-specific management table 141b, a type-specific management table 141c, a source-specific management table 141d, and a destination-specific management table 141e.

The overall management table 141a is a data table that summarizes all the available action records of a specific user, sorted into different ranges of elapsed time after email reception. Specifically, the illustrated overall management table 141a has the following data fields: "First 5 min," "5 to 60 min," "Over 60 min", and "Ratio of first 5 min." The "First 5 min" field indicates the number of action records that describe risky actions done by the user within the first five-minute period after email reception. The "5 to 60 min" field indicates the number of action records that describe risky actions done by the user within a period from five to sixty minutes after email reception. The "Over 60 min" field indicates the number of action records that describe risky actions done by the user more than sixty minutes after the email reception. The "Ratio of First 5 min" field indicates the ratio of action records in the first five-minute period noted above, over all the action records of the user.

The keyword-specific management table 141b is a two-dimensional data table that summarizes action records classified into groups depending on what keywords are included in their subject lines. In each group, action records are further sorted into different ranges of elapsed time after the reception of email. Specifically, the illustrated keyword-specific management table 141b has the following data fields: "Keyword," "First 5 min," "5 to 60 min," "Over 60 min", and "Ratio of First 5 min." The keyword field contains a specific keyword found in the subject line of email messages concerned. Note that the following data fields further classify, in terms of elapsed time, each group of action records that have a particular keyword seen in the keyword field. The "First 5 min" field indicates the number of action records that describe risky actions done by the user within the first five-minute period after the email reception. The "5 to 60 min" field indicates the number of action records that describe risky actions done by the user within a period from five to sixty minutes after the email reception. The "Over 60 min" field indicates the number of action records that describe risky actions done by the user more than sixty minutes after the email reception. The "Ratio of First 5 min" field indicates the ratio of action records in the first five-minute period noted above, over all the action records containing the corresponding keyword.

The type-specific management table 141c is a two-dimensional data table that summarizes action records classified into groups depending on their execution types. In each group, action records are further sorted into different ranges of elapsed time after the reception of email. Specifically, the illustrated type-specific management table 141c has the following data fields: "Execution Type," "First 5 min," "5 to 60 min," "Over 60 min", and "Ratio of First 5 min." The execution type field indicates the execution type of email messages, i.e., what type of risky action the user performed on received email. Note that the following data fields further classify, in terms of elapsed time, each group of action records that fall into a particular execution type seen in the execution type field. The "First 5 min" field indicates the number of action records that describe risky actions done by the user within the first five-minute period after the email reception. The "5 to 60 min" field indicates the number of action records that describe risky actions done by the user within a period from five to sixty minutes after the email reception. The "Over 60 min" field indicates the number of action records that describe risky actions done by the user more than sixty minutes after the email reception. The "Ratio of First 5 min" field indicates the ratio of action records in the first five-minute period noted above, over all the action records of the corresponding execution type.

The source-specific management table 141d is a two-dimensional data table that summarizes action records classified into groups depending on the category of their source addresses. In each group, action records are further sorted into different ranges of elapsed time after the reception of email. Specifically, the illustrated source-specific management table 141d has the following data fields: "Source Address," "First 5 min," "5 to 60 min," "Over 60 min", and "Ratio of First 5 min." The source address field indicates a category of email source addresses. More specifically, this data field contains either a value of "inside" for email from within the organization (e.g., company) or a value of "outside" for email from outside the organization. Note that the following data fields further classify, in terms of elapsed time, each group of action records whose email source addresses are categorized as seen in the source address field. The "First 5 min" field indicates the number of action records that describe risky actions done by the user within the first five-minute period after the email reception. The "5 to 60 min" field indicates the number of action records that describe risky actions done by the user within a period from five to sixty minutes after the email reception. The "Over 60 min" field indicates the number of action records that describe risky actions done by the user more than sixty minutes after the email reception. The "Ratio of First 5 min" field indicates the ratio of action records in the first five-minute period noted above, over all the action records of the corresponding source address category.

The destination-specific management table 141e is a two-dimensional data table that summarizes action records classified into groups depending on the category of their destination addresses. In each group, action records are further sorted into different ranges of elapsed time after the reception of email. Specifically, the illustrated destination-specific management table 141e has the following data fields: "Destination Address," "First 5 min," "5 to 60 min," "Over 60 min", and "Ratio of First 5 min." The destination address field indicates a category of destination addresses of email messages subjected to risky actions. For example, this destination address field takes a value of "To individual" or "CC individual" for email addressed to an individual user(s). The destination address field may also take a value of "To list" or "CC List for email addressed to a group of recipients including two or more of the users. Note that the following data fields further classify, in terms of elapsed time, each group of action records whose email destination addresses are categorized as seen in the destination address field. The "First 5 min" field indicates the number of action records that describe risky actions done by the user within the first five-minute period after the email reception. The "5 to 60 min" field indicates the number of action records that describe risky actions done by the user within a period from five to sixty minutes after the email reception. The "Over 60 min" field indicates the number of action records that describe risky actions done by the user more than sixty minutes after the email reception. The "Ratio of First 5 min" field indicates the ratio of action records in the first five-minute period noted above, over all the action records of the corresponding source address category.

FIG. 8 illustrates an example of a calendar-time-based summary. The illustrated calendar-time-based summary 141-2 is actually formed from a time-of-day execution ratio management table 141f, a day-of-week execution ratio management table 141g, and a day-of-month execution ratio management table 141h.

The time-of-day execution ratio management table 141f is a data table that summarizes the number of executed risky actions and its percentage in each different one-hour time period corresponding to the time of day. Specifically, the illustrated time-of-day execution ratio management table 141f includes the following data fields: "Time of Day," "Execution Count", and "Execution Ratio." The "Time of Day" field indicates one of a plurality of time periods divided according to the time of day. The "Execution Count" contains the number of risky actions executed in the corresponding time period, and the "Execution Ratio" field indicates the ratio of these risky actions to all the risky actions executed in a day.

The day-of-week execution ratio management table 141g is a data table that summarizes the number of executed risky actions and its percentage in each different one-day time period corresponding to the day of week. Specifically, the illustrated day-of-week execution ratio management table 141g includes the following data fields: "Day of Week," "Execution Count", and "Execution Ratio." The "Day of Week" field indicates each of the seven days in a week. The "Execution Count" field gives the number of risky actions executed in the corresponding day, and the "Execution Ratio" field indicates the ratio of these risky actions to all the risky actions executed in a week.

The day-of-month execution ratio management table 141h is a data table that summarizes the number of executed risky actions and its percentage in each different one-day time period corresponding to the day in a month. Specifically, the illustrated day-of-month execution ratio management table 141h includes the following data fields: "Day of Month," "Execution Count", and "Execution Ratio." The "Day of Month" field indicates each day in a month. The "Execution Count" field gives the number of risky actions executed in the corresponding day, and the "Execution Ratio" field indicates the ratio of these risky actions to all the risky actions executed in a month.

FIG. 9 illustrates an example of a fraudulent email detection record. The illustrated fraudulent email detection record 72 is formed from the following data fields: "Message ID," "Reception Date," "Reception Time," "Subject Keyword," "Source Address," "Destination Address", and "Execution Type." The message ID field contains a message identifier that indicates a message that has caused this fraudulent email detection record 72. Note that multicast email messages have the same message ID. The reception date field and reception time field contain character strings describing the date and time of day at which the fraudulent email message of interest was received. The subject keyword field contains keywords found in the subject header field of the fraudulent email message. These keywords are among a previously provided set of possible keywords. The source address field contains an email address that indicates the sender of the fraudulent email message. The destination address field contains an email address that indicates the recipient of the fraudulent email message. The execution type field contains information about what type of risky action was performed on the fraudulent email message.

The above description of FIGS. 5 to 9 has discussed various pieces of information that are used to delete fraudulent email messages in an appropriate order. To determine a proper delete sequence, the mail processing server 100 analyzes action patterns of individual users before making the determination. The procedure of an action pattern analysis begins with collecting action records that describe what risky actions the users actually did with their received email.

Figure 10:
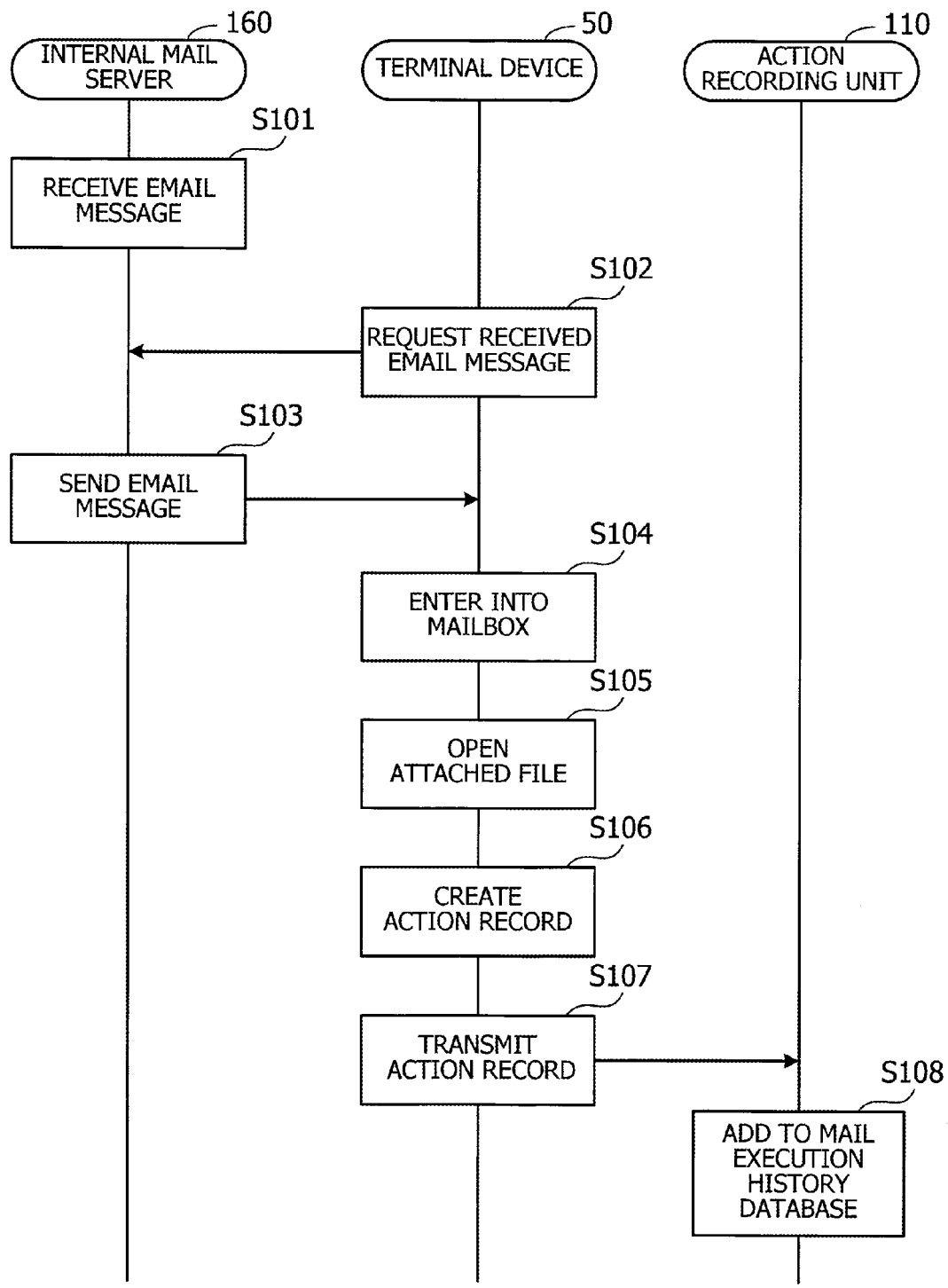
FIG. 10 is a sequence diagram illustrating a procedure of action record collection.

FIG. 10 is a sequence diagram illustrating a procedure of action record collection. The local mail server 160 receives an email message from the DMZ mail server 34 (step S101). The local mail server 160 enters this received message into a mailbox corresponding to the destination email address of the message. Afterward, the terminal device 50 sends the local mail server 160 a request for received email (step S102). For example, the mailer 52 in the terminal device 50 may be configured to send such requests at predetermined time intervals. The terminal device 50 may also send a mail download request in response to a request command issued by the user.

Upon receipt of the above request, the local mail server 160 transmits existing email messages from the user's mailbox to the terminal device 50 (step S103). The local mail server 160 may take the opportunity to delete these messages from the mailbox. The terminal device 50 receives the email messages from the local mail server 160 and enters them to an inbox folder of the mailbox 51 (step S104). Received email messages are downloaded in this way to the terminal device 50 through the above steps S102 to S104.

The user of the terminal device 50 now enters a command to view a received email message, and the terminal device 50 displays the message on a screen. When the email message contains a file attachment, the terminal device 50 indicates it by placing a specific icon on the screen. The user selects that icon, causing the terminal device 50 to open the attached file and displays its content on the screen (step S105).

The user's opening an attached file is a risky action, and the mailer 52 thus captures it as an action record (step S106). The items captured in this action record are similar to those in the data fields of the action management table 121 in FIG. 5, excluding the rightmost field "Action Pattern Flag." In the case of step S106, the actor information is the name of the user who is currently using the mailer 52. The reception timestamp, source, and destination can be extracted from the header of the email message of interest. The execution timestamp is obtained from an internal real-time clock of the terminal device 50 at the moment when the attached file is opened. Subject keywords may be found in the subject header field of the message of interest. The execution type is determined from the extension of the attached file.

The terminal device 50 transmits the above action record to the action recording unit 110 (step S107). The action recording unit 110 receives the action record and adds it to the mail execution history database 120 as an additional action (step S108). For example, the action recording unit 110 adds the received action record as a new entry for the action management table 121, giving an initial value of "Pending" to its action pattern flag field.

The above has illustrated how the log records of user actions (opening email attachments) are accumulated in the mail execution history database 120. In addition to the file-opening actions, other kind of actions such as selecting URL in the email body to visit a web page may similarly be recorded in the mail execution history database 120.

Figure 11:
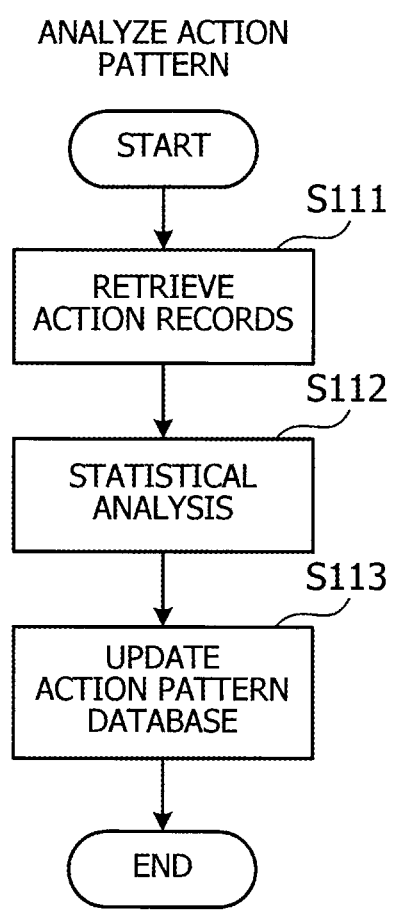
FIG. 11 is a flowchart illustrating an example of an outline of an action pattern analysis.

The action records accumulated in the mail execution history database 120 are then subjected to an action pattern analysis for individual users. The action pattern management unit 130 executes this analysis. FIG. 11 is a flowchart illustrating an example of an outline of an action pattern analysis.

(Step S111) The action pattern management unit 130 retrieves action records out of the action management table 121 at regular intervals (e.g., every hour). Specifically, the action pattern management unit 130 retrieves action records having a value of "Pending" in their action pattern flag field.

(Step S112) The action pattern management unit 130 executes a statistical analysis on the basis of the retrieved action records. Details of this statistical analysis will be described later.

(Step S113) According to the result of the statistical analysis, the action pattern management unit 130 updates datasets in the action pattern database 140.

The action patterns are determined in the above way. That is, the action pattern management unit 130 selects pending action patterns one by one and updates the action pattern database with each selected action pattern.

Figure 12:
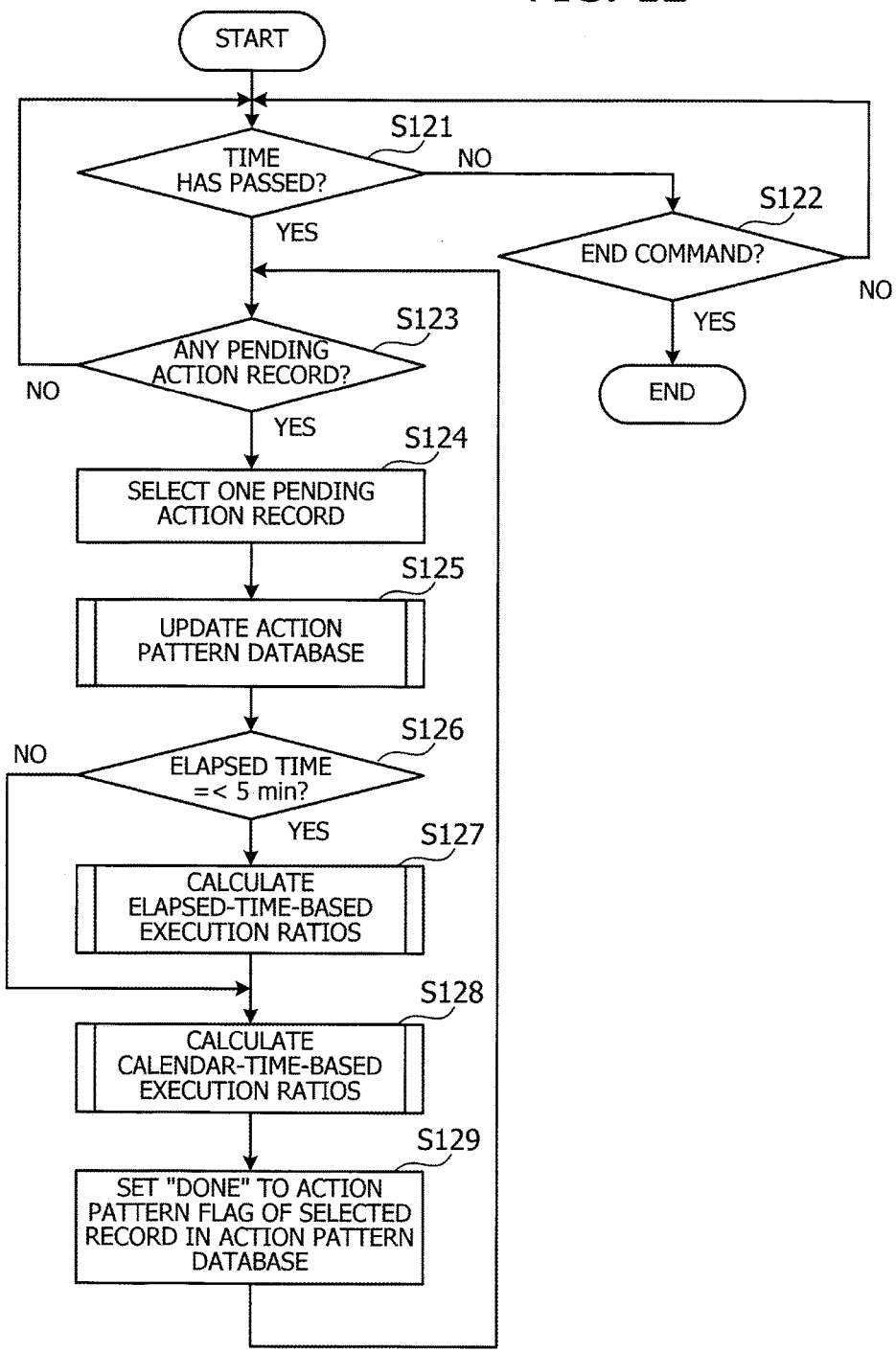
FIG. 12 is a flowchart illustrating an example of a detailed procedure of an action pattern analysis.

The next flowchart describes the aforementioned action pattern analysis in detail. FIG. 12 is a flowchart illustrating an example of a detailed procedure of step S112 of the action pattern analysis.

(Step S121) The action pattern management unit 130 determines whether a certain amount of time has passed since the previous analysis cycle. If so, the procedure advances to step S123. If not, the procedure proceeds to step S122.

(Step S122) The action pattern management unit 130 determines whether an end command is present. If present, the statistical analysis is terminated accordingly. If not, the procedure returns to step S121.

(Step S123) The action pattern management unit 130 determines whether the mail execution history database 120 has any action records that are not reflected in the action pattern database 140. For example, the action pattern management unit 130 searches the action management table 121 for action records having a value of "Pending" in the action pattern flag field. When such pending records are found, the procedure advances to step S124. When there is no pending record, the procedure returns to step S121.

(Step S124) The action pattern management unit 130 selects one pending action record from the mail execution history database 120. The selected action record contains information about the actor, reception timestamp, execution timestamp, subject keywords, source address, destination address, and execution type.

Now the following steps S125 to S128 will update the action pattern management dataset corresponding to the actor of the selected action record.

(Step S125) The action pattern management unit 130 updates the action pattern database. Details of this step will be described later with reference to FIG. 13.

(Step S126) The action pattern management unit 130 determines whether the elapsed time obtained from the selected action record is in the first five minutes after the email reception. Here the elapsed time, or the time from email reception to risky action, is obtained as a difference between the reception timestamp and the execution timestamp in the selected action record. If the elapsed time is five minutes or less, then the procedure advances to step S127. If the elapsed time is longer than five minutes, the procedure skips to step S128.

(Step S127) The action pattern management unit 130 calculates elapsed-time-based execution ratios. Details of this step will be described later with reference to FIG. 14.

(Step S128) The action pattern management unit 130 calculates calendar-time-based execution ratios. Details of this step will be described later with reference to FIG. 15.

(Step S129) The action pattern management unit 130 makes access to the mail execution history database 120 created by the action recording unit 110 and changes the action pattern flag to "Done" for the selected action record in the action management table 121. The procedure then returns to step S123.

Figure 13:
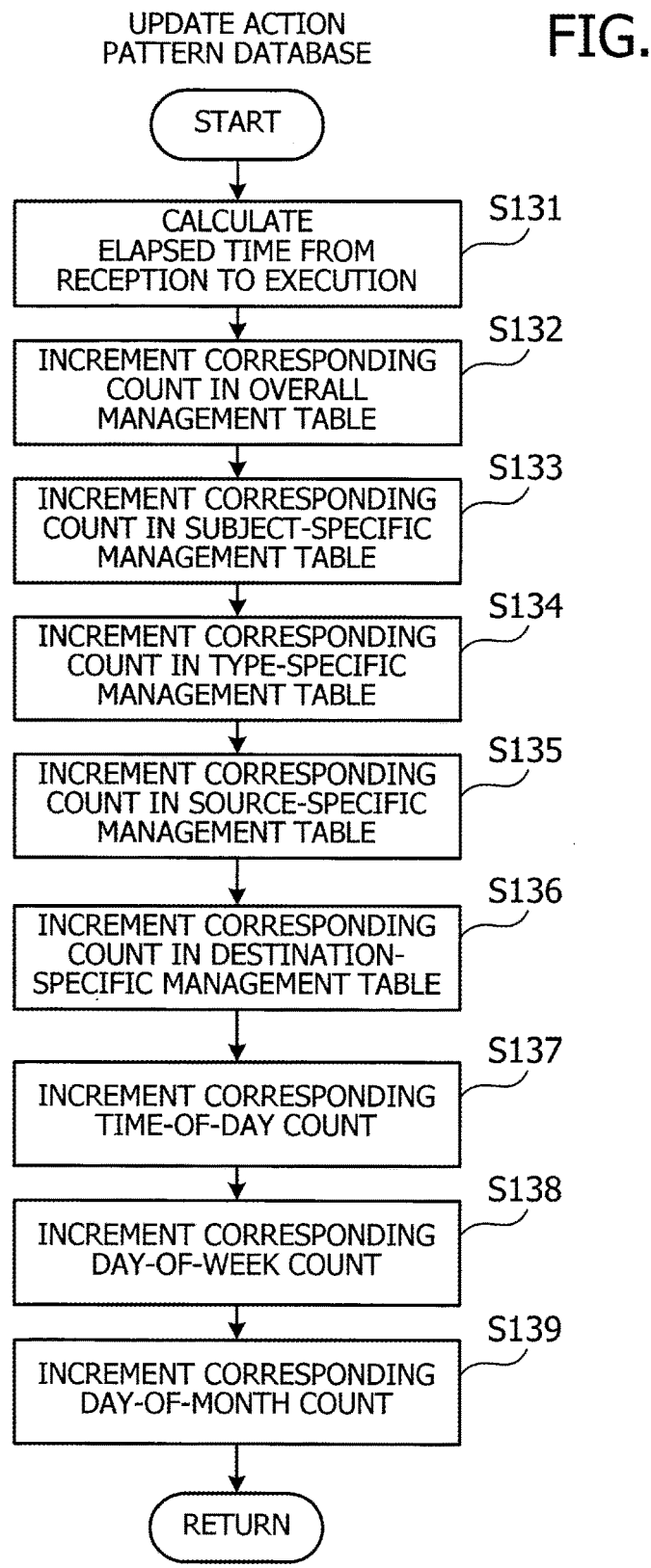
FIG. 13 is a flowchart illustrating an example of action pattern database update operations.

The next description will provide details of the procedure called in step S125 for updating the action pattern database with a selected action record. FIG. 13 is a flowchart illustrating an example of action pattern database update operations.

(Step S131) The action pattern management unit 130 calculates an elapsed time from mail reception to risky action. For example, the elapsed time is obtained as a difference between the reception timestamp and the execution timestamp in the selected action record.

(Step S132) The action pattern management unit 130 increments by one the current value of a data cell in the overall management table 141*a* (FIG. 7) that corresponds to the elapsed time calculated in step S131. Suppose, for example, that the elapsed time is 45 minutes. In this case, the cell of "5 to 60 min" is incremented by one.

(Step S133) The action pattern management unit 130 increments by one the current value of a data cell in the keyword-specific management table 141*b* (FIG. 7) that corresponds to the elapsed time calculated in step S131. Suppose, for example, that the elapsed time is three minutes and the mail subject line contains the word "urgent." In this case, the cell at row "urgent" and column "First 5 min" is incremented by one.

(Step S134) The action pattern management unit 130 increments by one the current value of a data cell in the type-specific management table 141*c* (FIG. 7) that corresponds to the combination of the elapsed time calculated in step S131 and the execution type indicated in the selected action record.

(Step S135) The action pattern management unit 130 increments by one the current value of a data cell in the source-specific management table 141*d* (FIG. 7) that corresponds to the combination of the elapsed time calculated in step S131 and the source address indicated in the selected action record.

(Step S136) The action pattern management unit 130 increments by one the current value of a data cell in the destination-specific management table 141*e* (FIG. 7) that corresponds to the combination of the elapsed time calculated in step S131 and the destination address indicated in the selected action record.

(Step S137) The action pattern management unit 130 increments by one the current value of a data cell in the time-of-day execution ratio management table 141*f* (FIG. 8) that corresponds to the execution timestamp indicated in the selected action record. Suppose, for example, the execution timestamp indicates the time "09:30." In this case, the execution count cell for "09:00 to 10:00" is incremented by one.

(Step S138) The action pattern management unit 130 increments by one the current value of a data cell in the day-of-week execution ratio management table 141*g* (FIG. 8) that corresponds to the execution timestamp indicated in the selected action record.

(Step S139) The action pattern management unit 130 increments by one the current value of a data cell in the day-of-month execution ratio management table 141*h* (FIG. 8) that corresponds to the execution timestamp indicated in the selected action record.

Figure 14:
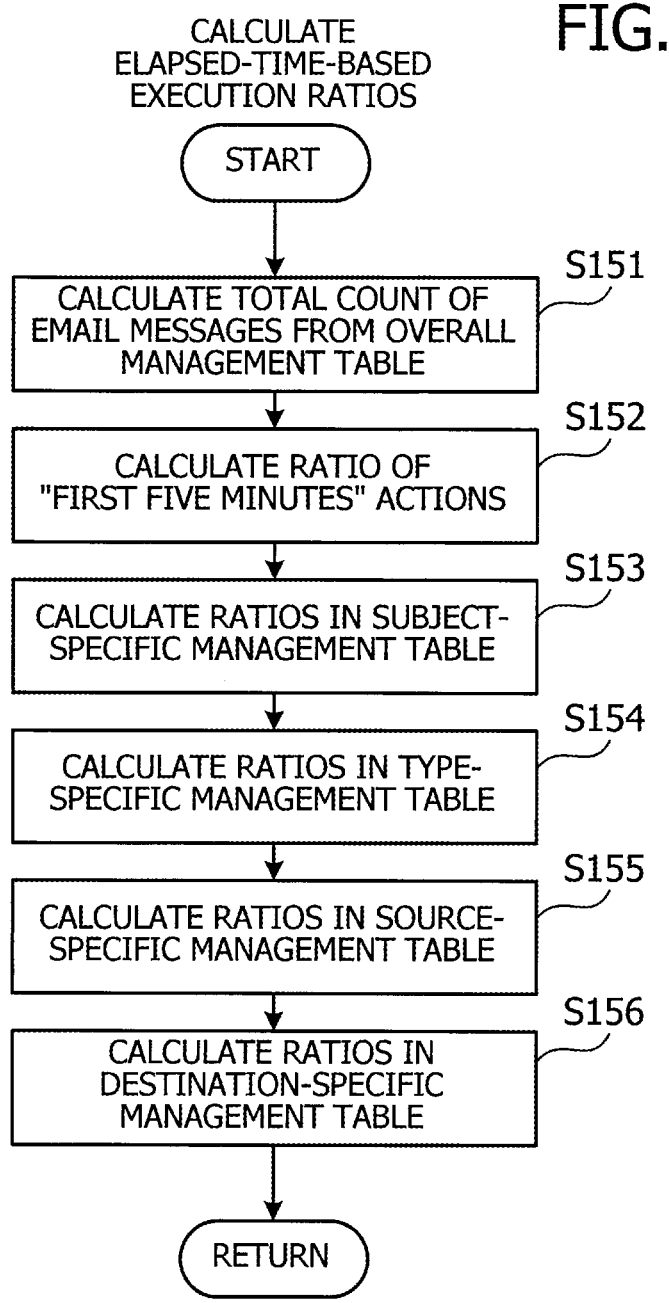
FIG. 14 is a flowchart illustrating an exemplary procedure of calculating elapsed-time-based execution ratios.

The next description will provide details of the procedure called in step S127 of FIG. 12 for calculating elapsed-time-based execution ratios. FIG. 14 is a flowchart illustrating an exemplary procedure of calculating elapsed-time-based execution ratios;

(Step S151) The action pattern management unit 130 calculates the total count of recorded email messages on the basis of the overall management table 141*a* (FIG. 7). Referring to the example seen in FIG. 7, there are 420 records (i.e., 100+200+120=420).

(Step S152) The action pattern management unit 130 calculates the ratio of email messages that led to a risky action in the first five minute after their reception over all the email messages recorded. In the example of FIG. 7, this ratio is 100/420, or about 0.24, since the overall management table 141*a* indicates that one hundred actions were done in the first five-minute period.

(Step S153) The action pattern management unit 130 calculates the ratio of email messages that led to a risky action in the first five minutes, on the basis of the keyword-specific management table 141*b* (FIG. 7). This calculation is performed only in the row of a keyword whose corresponding records have been updated in step S133 of FIG. 13. More specifically, the action pattern management unit 130 first calculates the total count of the noted keyword. Referring to the example of FIG. 7, the row of keyword "urgent" contains eight action records (i.e., 5+3+0=8). Then the action pattern management unit 130 divides the count in the corresponding "First 5 min" field by the above total count, thereby obtaining the execution ratio of the first five minutes. In the case of keyword "urgent," its corresponding execution ratio is calculated to be 0.63 (i.e., ⅝).

(Step S154) The action pattern management unit 130 calculates the ratio of email messages that led to a risky action in the first five minutes, on the basis of the type-specific management table 141*c* (FIG. 7). This calculation is performed only in the row of an execution type whose corresponding records have been updated in step S134 of FIG. 13. More specifically, the action pattern management unit 130 first calculates the total count of the noted execution type. Then the action pattern management unit 130 divides the count in the corresponding "First 5 min" field by the above total count, thereby obtaining an execution ratio of the first five minutes.

(Step S155) The action pattern management unit 130 calculates the ratio of email messages that led to a risky action in the first five minutes, on the basis of the source-specific management table 141*d* (FIG. 7). This calculation is performed only in the row of a source address category whose corresponding records have been updated in step S135 of FIG. 13. More specifically, the action pattern management unit 130 first calculates the total count of the noted source address category. Then the action pattern management unit 130 divides the count in the corresponding "First 5 min" field by the above total count, thereby obtaining an execution ratio of the first five minutes.

(Step S156) The action pattern management unit 130 calculates the ratio of email messages that led to a risky action in the first five minutes, on the basis of the destination-specific management table 141*e* (FIG. 7). This calculation is performed only in the row of a destination address category whose corresponding records have been updated in step S136 of FIG. 13. More specifically, the action pattern management unit 130 first calculates the total count of the noted destination address category. Then the action pattern management unit 130 divides the count in the corresponding "First 5 min" field by the above total count, thereby obtaining an execution ratio of the first five minutes.

Figure 15:
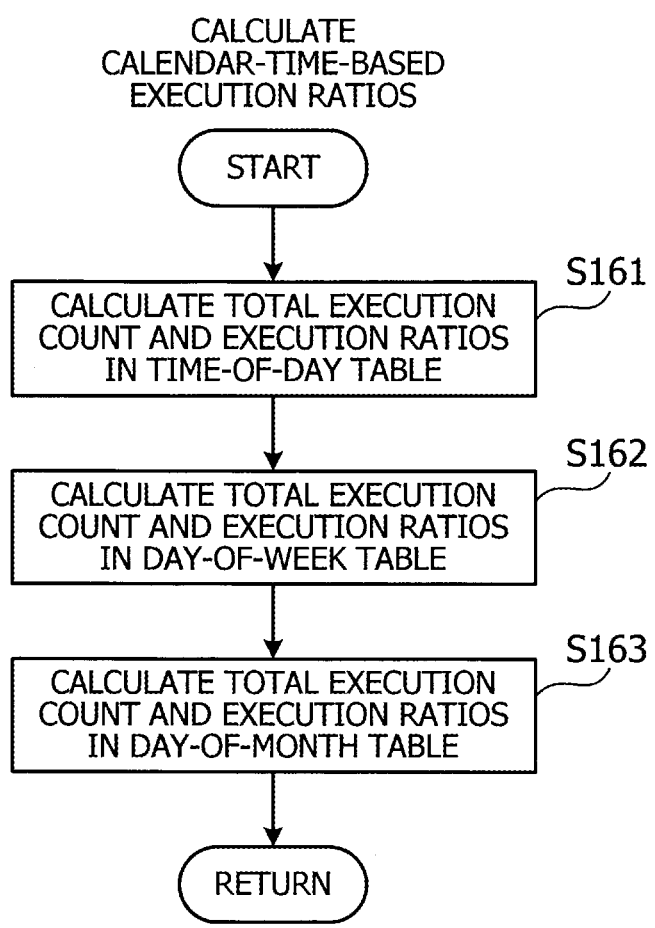
FIG. 15 is a flowchart illustrating an exemplary procedure of calculating calendar-time-based execution ratios.

The next description will provide details of the procedure called in step S128 of FIG. 12 for calculating calendar-time-based execution ratios. FIG. 15 is a flowchart illustrating an exemplary procedure of calculating calendar-time-based execution ratios;

(Step S161) The action pattern management unit 130 calculates the ratio of email messages that led to a risky action in each of the time ranges seen in the time-of-day execution ratio management table 141*f* (FIG. 8). More specifically, the action pattern management unit 130 first calculates the total execution count of all time ranges in a day, with reference to the time-of-day execution ratio management table 141*f*. Then the action pattern management unit 130 divides each hour's count by the above total execution count, thereby obtaining execution ratios.

(Step S162) The action pattern management unit 130 calculates the ratio of email messages that led to a risky action in each of the time ranges seen in the day-of-week execution ratio management table 141*g* (FIG. 8). More specifically, action pattern management unit 130 first calculates the total execution count of all days in a week, with reference to the day-of-week execution ratio management table 141*g*. Then the action pattern management unit 130 divides each day's count by the above total execution count, thereby obtaining execution ratios.

(Step S163) The action pattern management unit 130 calculates the ratio of email messages that led to a risky action in each of the time ranges seen in the day-of-month execution ratio management table 141*h* (FIG. 8). More specifically, action pattern management unit 130 first calculates the total execution count of all days in a month, with reference to the day-of-month execution ratio management table 141*h*. Then the action pattern management unit 130 divides each day's count by the above total execution count, thereby obtaining execution ratios.

The action pattern database 140 is updated in the above way, so that it maintains each user's personal behavioral pattern of risky actions. When the mail sensor 33 detects a fraudulent email message, the mail deletion unit 150 consults this action pattern database 140 to determine the possibility that any receiving user shortly takes risky actions with regard to the detected fraudulent email message.

Figure 16:
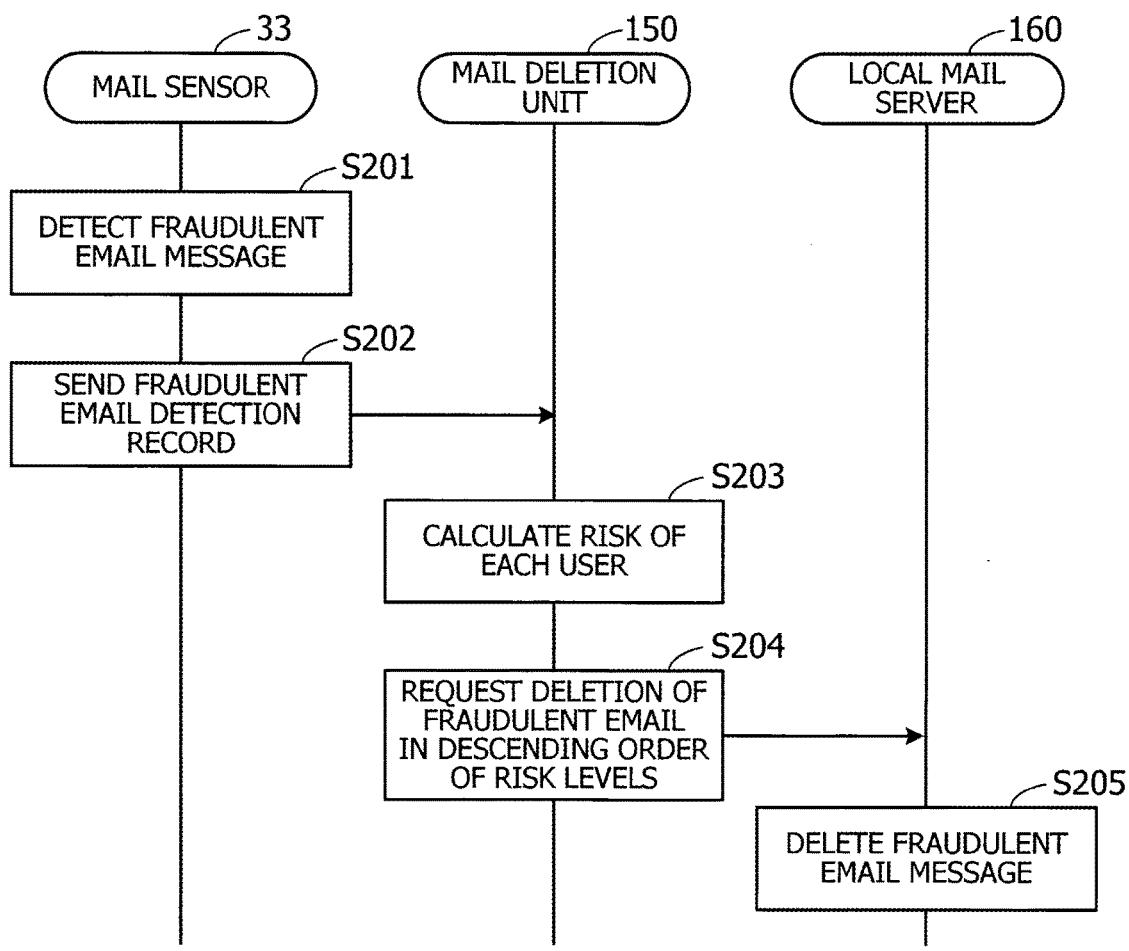
FIG. 16 is a sequence diagram illustrating an exemplary procedure of deleting fraudulent email.

FIG. 16 is a sequence diagram illustrating an exemplary procedure of deleting fraudulent email. Suppose now that the mail sensor 33 detects a fraudulent email message (step S201). The mail sensor 33 sends a fraudulent email detection record to the mail deletion unit 150 (step S202). Then the mail deletion unit 150 calculates each destination user's likelihood of conducting risky actions in the very near future (step S203).

The mail deletion unit 150 selects the destination users in descending order of their risk levels (i.e., of their likelihood of upcoming risky actions), and sends the local mail server 160 a request for deleting the fraudulent email message from mailboxes of the selected users (step S204). For example, this email deletion request may contain, among other things, email addresses of the selected users and a message ID that specifies the fraudulent email message to be deleted.

In response to the request, the local mail server 160 deletes the fraudulent email message from mailboxes of the selected users (step S205). For example, the local mail server 160 deletes the message having the specified message ID from the mailboxes corresponding to the specified email addresses.

Figure 17:
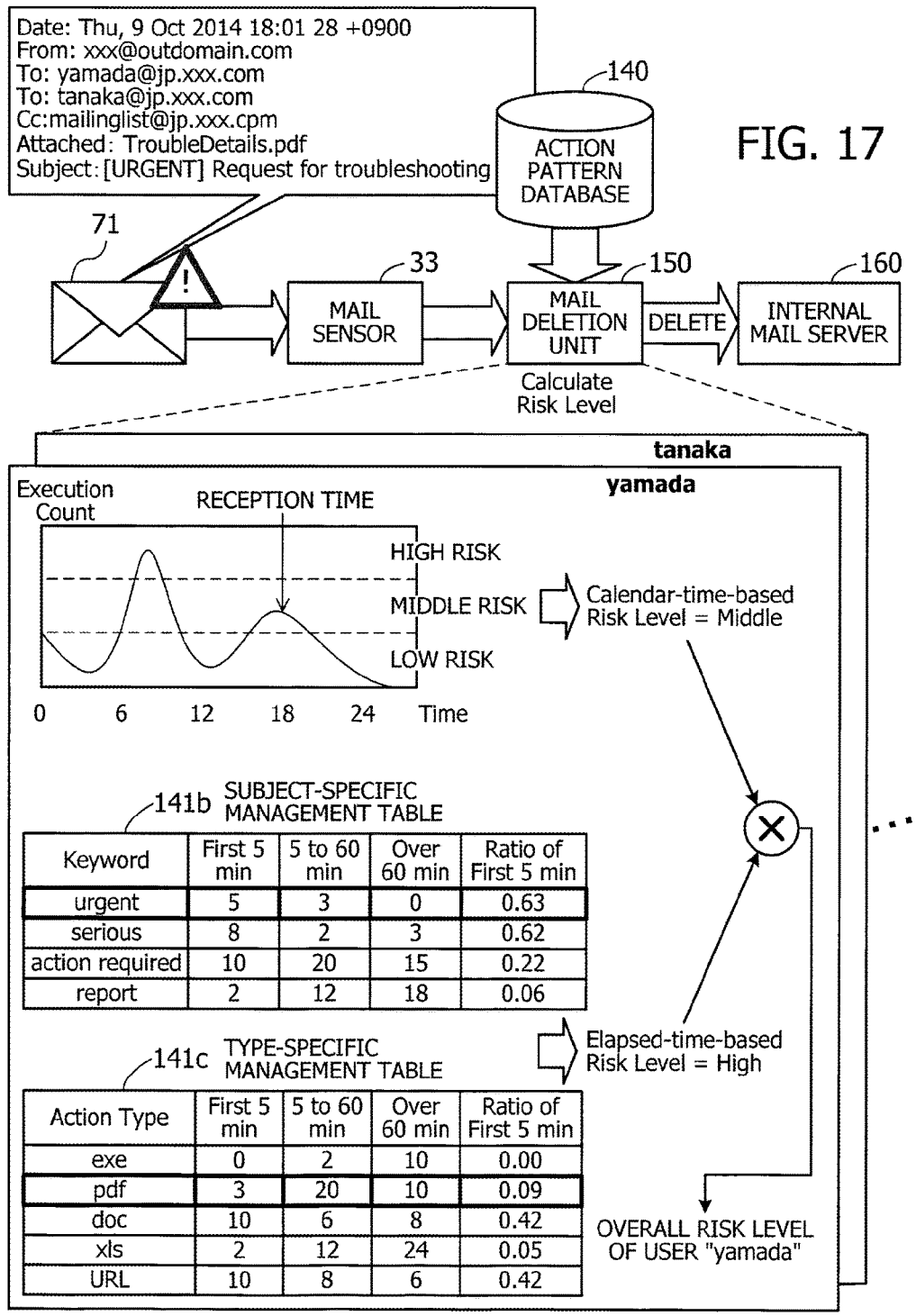
FIG. 17 illustrates an example of risk determination of individual users.

The risk levels of individual users are evaluated from multiple viewpoints. For example, one viewpoint is based on elapsed times from email reception to actions, and another is based on calendar date and time of actions. FIG. 17 illustrates an example of risk determination of individual users. It is assumed in the example of FIG. 17 that a fraudulent email message 71 received at 18:01 (6:01 pm) has a subject line containing the word "urgent" and a PDF file attachment. This fraudulent email message 71 is detected by the mail sensor 33, and a fraudulent email detection record 72 is thus sent from the mail sensor 33 to the mail deletion unit 150.

The mail deletion unit 150 retrieves action pattern management datasets of receiving users from the action pattern database 140. That is, for each destination user of the fraudulent email message 71, the mail deletion unit 150 investigates from various viewpoints the possibility of opening the attached PDF file in a short time (e.g., in five minutes). For example, one user's time-of-day execution ratio management table 141$f$ may suggest in what time ranges in a day the user is likely to do a risky action. If the current time falls within a high-likelihood time range, the mail deletion unit 150 determines that the user is now in a high-risk situation. If the current time is associated with a certain level of likelihood of risky actions, the mail deletion unit 150 determines that the user is in a middle-risk situation. If risky actions are unlikely at present, the mail deletion unit 150 determines that the user is in a low-risk situation.

As another viewpoint, the keyword-specific management table 141$b$ of the same user indicates a high likelihood of risky actions in the first five minutes if the received message contains the word "urgent" in its subject line. In contrast, the type-specific management table 141$c$ suggests a relatively low likelihood of opening an email attachment if it is a PDF file. In this case, the mail deletion unit 150 may choose a higher one of these elapsed-time-based risk levels, thus concluding that the user is currently in a high-risk situation as seen in the example of FIG. 17.

Now that the calendar-time-based risk level and elapsed-time-based risk level have been determined above, the mail deletion unit 150 combines these things to calculate the overall risk level of the user of interest. For example, the mail deletion unit 150 may evaluate the calendar-time-based and elapsed-time-based risk levels quantitatively and calculate the product of their values, thereby obtaining the user's overall risk level.

Figure 18:
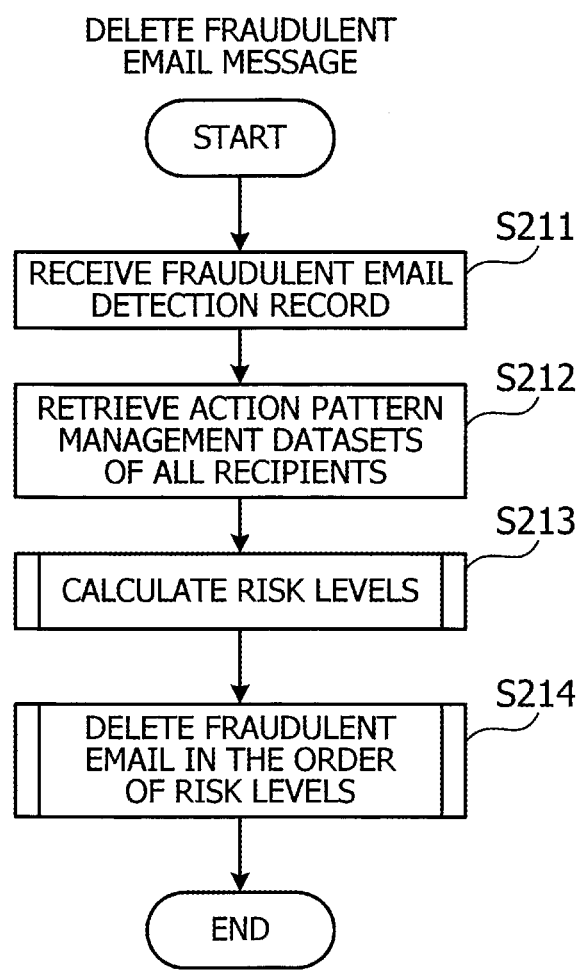
FIG. 18 is a flowchart illustrating a procedure of deleting fraudulent email.

The mail deletion unit 150 calculates the above for individual destination users of the fraudulent email message 71 and starts email deletion with the users in the highest risk situation. The following section describes in detail how the mail deletion unit 150 deletes fraudulent email messages. FIG. 18 is a flowchart illustrating a procedure of deleting fraudulent email.

(Step S211) The mail deletion unit 150 receives a fraudulent email detection record.

(Step S212) The mail deletion unit 150 retrieves action pattern management datasets of all recipients of the fraudulent email message. For example, the mail deletion unit 150 first identifies every specified destination from email addresses seen in the destination address field of the fraudulent email detection record. Then the mail deletion unit 150 consults the action pattern database 140 to retrieve action pattern management datasets of users who are among the identified destinations.

(Step S213) The mail deletion unit 150 calls a procedure for calculating the overall risk level of each user. Details of this risk level calculation will be described later with reference to FIG. 19.

(Step S214) The mail deletion unit 150 calls a procedure for deleting fraudulent email messages in the order of risk levels. Details of this step will be described later with reference to FIG. 20.

Figure 19:
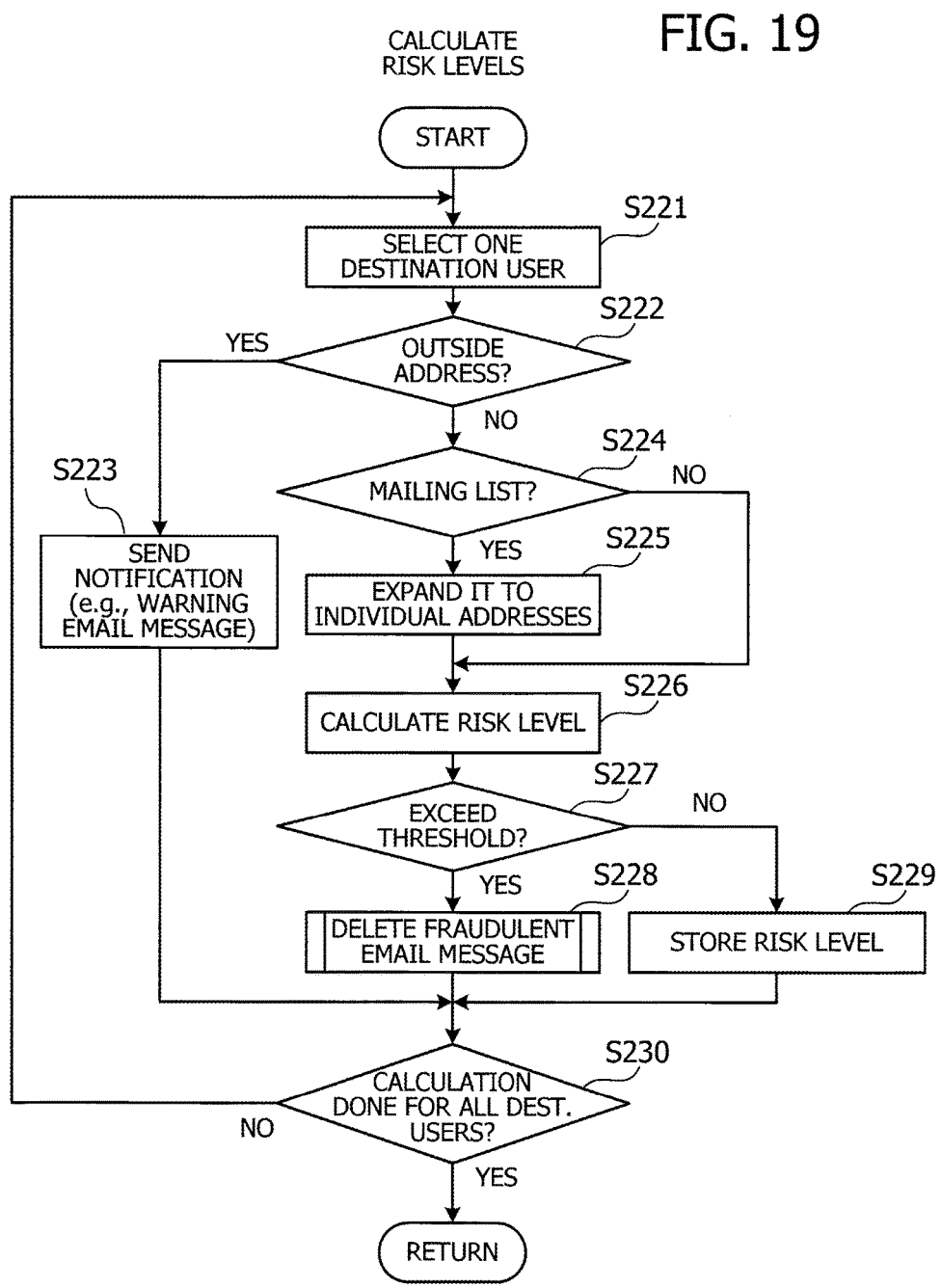
FIG. 19 is a flowchart illustrating a procedure of calculating risk levels.

FIG. 19 is a flowchart illustrating a procedure for calculating risk levels.

(Step S221) The mail deletion unit 150 selects one destination user of the fraudulent email message. For example, the mail deletion unit 150 selects one of the addresses enumerated in the destination address field of the fraudulent email detection record. As will be discussed later, this selected user address may be a mailing list address.

(Step S222) The mail deletion unit 150 determines whether the selected address belongs to the inside or outside of the organization. For example, the mail deletion unit 150 checks the domain name (i.e., the part after the symbol "@") of the selected address. If the domain name is of an in-house server, then it means the selected address belongs to the organization, and the procedure advances to step S224. If the domain name indicates an outside address, the procedure branches to step S223.

(Step S223) The mail deletion unit 150 sends a dedicated notification to the selected user. For example, the mail deletion unit 150 generates an email message addressed to the selected user to warn him or her of the presence of a fraudulent email message. The procedure then proceeds to step S230.

(Step S224) The mail deletion unit 150 determines whether the selected user address is a mailing list address. For example, the mail deletion unit 150 has one or more addresses previously defined for mailing lists. The selected address is compared with each of these mailing list addresses, and if a match is found, the procedure advances to step S225. If no match is found, the procedure skips to step S226.

(Step S225) The mail deletion unit 150 expands the mailing list into individual addresses. For example, the mail deletion unit 150 asks the local mail server 160 about what user addresses are included in the mailing list. The local mail server 160 responds to this query by sending relevant user addresses back to the mail deletion unit 150, so that the mail deletion unit 150 obtains a set of individual addresses of all the users belonging to the mailing list in question. Note that each individual address revealed from a mailing list will be subjected to steps S226 to S229 described below.

(Step S226) The mail deletion unit 150 calculates a risk level of the selected user. For example, the mail deletion unit 150 refers to all tables in the action pattern management dataset of the selected user and extracts the values of execution ratios pertaining to the fraudulent email message. The mail deletion unit 150 multiplies the extracted execution ratios with one another and outputs the resulting product as the user's risk level. Suppose, for example, that the following values are given in the present fraudulent email detection record:

Reception Date: 2014 Nov. 1 (Mon)
Reception Time: 09:03
Subject Keyword: urgent
Source Address: Inside
Destination Address: To individual
Execution type: doc It is also supposed that the selected user has his or her action pattern management dataset as seen in FIGS. 7 and 8.

In this example, an execution ratio of 0.24 is extracted from the "Ratio of First 5 min" field of the overall management table 141a in FIG. 7. Another execution ratio of 0.63 is extracted from the from the "Ratio of First 5 min" field corresponding to keyword "urgent" in the keyword-specific management table 141b. Yet another execution ratio of 0.42 is extracted from the "Ratio of First 5 min" field corresponding to execution type "doc" in the type-specific management table 141c. Still another execution ratio of 0.30 is extracted from the "Ratio of First 5 min" field corresponding to source address "inside" in the source-specific management table 141d. Still another execution ratio of 0.62 is extracted from the "Ratio of First 5 min" field corresponding to destination address "To individual" in the destination-specific management table 141e. Further, still another execution ratio of 0.13 is extracted from the cell for "09:00 to 10:00" in the time-of-day execution ratio management table 141f. Still another execution ratio of 0.17 is extracted from the cell for "Monday" in the day-of-week execution ratio management table 141g. Still another execution ratio 0.05 is extracted from the cell for date "1" in the day-of-month execution ratio management table 141h. The product of all the extracted values is calculated as follows:

$$0.24 \times 0.63 \times 0.42 \times 0.30 \times 0.62 \times 0.13 \times 0.17 \times 0.05 = 0.000013$$

That is, the currently selected user is evaluated to have a risk level of 0.000013.

(Step S227) The mail deletion unit 150 determines whether the risk level exceeds a specific threshold. If the risk level exceeds the threshold, the procedure advances to step S228. Otherwise, the procedure proceeds to step S229.

(Step S228) The mail deletion unit 150 calls a procedure of deleting a fraudulent email message received by the selected user. Details of this fraudulent email deletion will be described later with reference to FIG. 21. The procedure then proceeds to step S230.

(Step S229) The mail deletion unit 150 stores the risk level in a memory, together with user information.

(Step S230) The mail deletion unit 150 determines whether the risk level calculation has been done for all the destination users. If so, the mail deletion unit 150 exits from the present procedure. If there is any pending destination user, the procedure returns to step S221.

Figure 20:
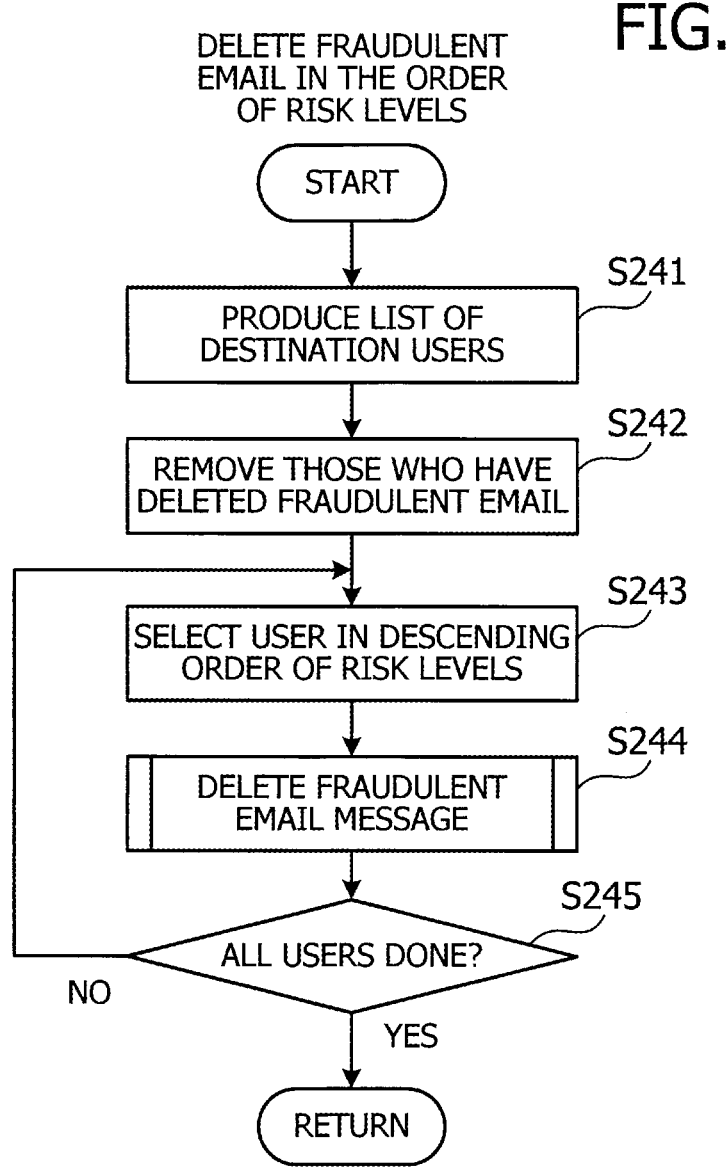
FIG. 20 illustrates an exemplary procedure of deleting fraudulent email in the order of risk levels.

The next description provides the details of step S214 of FIG. 18, i.e., how the mail deletion unit 150 deletes fraudulent email in the order of risk levels. FIG. 20 illustrates an exemplary procedure of deleting fraudulent email in the order of risk levels.

(Step S241) The mail deletion unit 150 produces a list of destination users of the fraudulent email message. In the case where the destinations include a mailing list, its constituent individual addresses are added to the list of destination users.

(Step S242) The produced list may include the users whose fraudulent email has already been deleted in step S228 of FIG. 19. The mail deletion unit 150 removes these users from the list.

(Step S243) The mail deletion unit 150 selects the users in descending order of their risk levels. For example, the mail deletion unit 150 sorts the listed users in descending order of their risks and selects the users one by one in the sorted order.

(Step S244) The mail deletion unit 150 calls a procedure of deleting fraudulent email of the selected user. Details of this step will be described later with reference to FIG. 21.

(Step S245) The mail deletion unit 150 determines whether the fraudulent email deletion is finished for all the listed users. When it is finished for all the users, the mail deletion unit 150 exits from this procedure of FIG. 20. When there is any unfinished user, the procedure goes to step S243.

Figure 21:
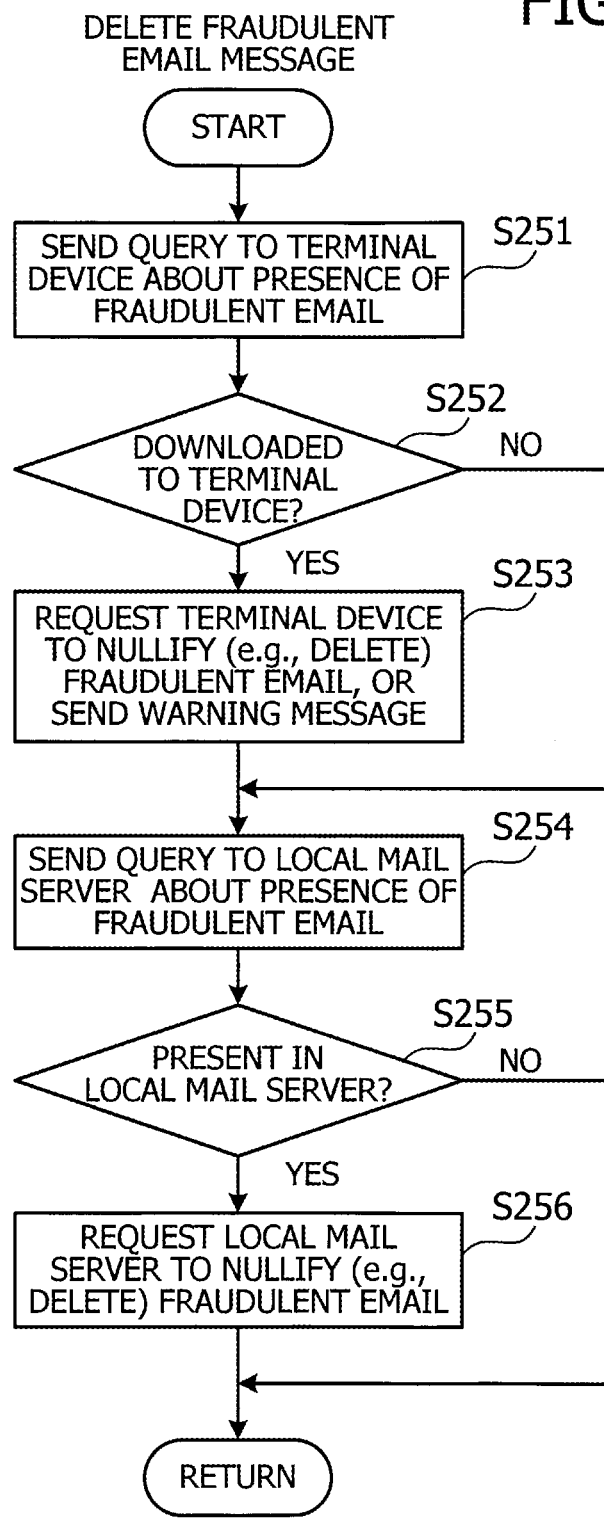
FIG. 21 illustrates an exemplary procedure of deleting fraudulent email.

The following description provides details of how the mail deletion unit 150 deletes fraudulent email in step S228 of FIG. 19 and step S244 of FIG. 20. FIG. 21 illustrates an exemplary procedure of deleting fraudulent email.

(Step S251) The mail deletion unit 150 sends a query to the terminal device of the currently selected user to ask whether it has a copy of the fraudulent email message. It is assumed, for example, that the mail deletion unit 150 has a database of user terminal devices and thus knows their respective identifiers such as Internet Protocol (IP) addresses. The mail deletion unit 150 uses this information, together with a message ID described in the fraudulent email detection record 72, in creating and sending a query about the fraudulent email message of interest. Specifically, this query asks the receiving terminal device about the presence of an email message with the same message ID specified in the query. In response to the query, the terminal device searches its own mailbox for a message having the specified message ID. If a relevant email message is found in the mailbox, the terminal device so notifies the mail deletion unit 150.

(Step S252) Based on a response from the terminal device, the mail deletion unit 150 determines whether the fraudulent email message has been downloaded. For example, the fraudulent email message is determined to be downloaded when the terminal device indicates the presence of the same, and in that case, the procedure advances to step S253. If it is not downloaded, the procedure skips to step S254.

(Step S253) The mail deletion unit 150 requests the terminal device to nullify the fraudulent email message that has been downloaded. The terminal device accordingly deletes the message from its mailbox. As another example of email nullification, the terminal device may quarantine the message. For example, the terminal device may isolate the message from browser applications and inhibits execution of its attached files. When the terminal device has no nullifying functions, the mail deletion unit 150 may alternatively send the user a message (e.g., by email) indicating the reception of a fraudulent email message.

(Step S254) The mail deletion unit 150 asks the local mail server 160 about whether the selected user has a copy of the fraudulent email message in his or her mailbox. For example, the mail deletion unit 150 sends the message ID of the fraudulent email message, together with the user's email address, to the local mail server 160, thus asking about the presence of an email message with the same message ID. Here the message ID is described in the fraudulent email detection record. In response, the local mail server 160 searches the specified mailbox to find a message having the specified message ID. If a relevant email message is found in the mailbox, the local mail server 160 so notifies the mail deletion unit 150.

(Step S255) Based on a response from the local mail server 160, the mail deletion unit 150 determines whether the fraudulent email message is present. When the message is present, the procedure advances to step S256. Otherwise, the mail deletion unit 150 exits from this procedure of deleting fraudulent email.

(Step S256) The mail deletion unit 150 requests the local mail server 160 to nullify the fraudulent email message that is found. The local mail server 160 accordingly nullifies the message (e.g., delete it from the mailbox). As another possible method for nullification, the mail deletion unit 150 may quarantine the fraudulent email message by moving it to a folder that the users are not allowed to access.

The second embodiment for deleting fraudulent email messages has been discussed above. As can be seen from the above description, the second embodiment is designed to delete such email from mailboxes of users in descending order of their tendencies of performing risky actions in a short time. For example, electronic mail could bring malware or other security threats into the receiving terminal devices. The proposed techniques reduce the chance of causing such undesired things, thus preventing propagation of a security threat across terminal devices.

Although some users may have already downloaded fraudulent messages in their local mailboxes, the problem can still be alleviated by commanding their terminal devices to delete the message in descending order of risk levels. For terminal devices lacking such deletion functions, some alternative methods may be used. For example, the users may be notified of a detected fraudulent email message through a messenger application, email, telephone, or the like, in descending order of their risk levels.

(c) Third Embodiment

This part of the description explains a third embodiment that improves the way of calculating user-specific risk levels for better accuracy. The foregoing second embodiment has proposed that the overall risk level of a user is evaluated as a simple multiplication of all risk levels individually calculated in each different aspect (e.g., elapsed-time-based aspect and calendar-time-based aspect) of email. The proposed method of the second embodiment is advantageous in terms of the calculation time length. However, the resulting overall risk level could underestimate the danger if a particular aspect indicates a low risk level. In other words, the presence of such low-risk aspects would thin down the significance of other aspects.

FIG. 22 illustrates a drawback of relying on the simple product of all risk levels of different aspects. It is assumed in FIG. 22 that a fraudulent email message having a keyword "important" in its subject line is received from outside the organization in a period from 00:00 to 01:00.

Referring first to the action pattern of recipient A, his or her execution ratio of risky actions is 0.1 as to the email messages received in a period from 00:00 to 01:00. For messages containing "important" in the subject line, the same recipient A exhibits a high execution ratio of 0.8 in the first five-minute period. For messages sent from outside his or her organization, recipient A may perform risky actions only at the execution ratio of 0.1 in the first five-minute period. The overall risk level of recipient A is calculated by multiplying all these values together, and it thus gives a value of 0.008.

Referring next to the action pattern of recipient B, his or her execution ratio of risky actions is 0.1 as to messages received in a period from 00:00 to 01:00. For messages containing "important" in the subject line, the same recipient B may perform risky actions at the execution ratio of 0.4 in the first five-minute period. For messages sent from outside his or her organization, recipient B may perform risky actions at the execution ratio of 0.2 in the first five-minute period. The overall risk level of recipient B is calculated by multiplying all these values together, and it thus gives a value of 0.008.

Referring lastly to the action pattern of recipient C, his or her execution ratio of risky actions is 0.2 as to messages received in a period from 00:00 to 01:00. For messages containing "important" in the subject line, recipient C has the same execution ratio of 0.2 in the first five-minute period. This is also true for messages sent from outside the organization of recipient C. The overall risk level of recipient C is calculated by multiplying all these values together, and it thus gives a value of 0.008.

Recipient A in this example is likely to perform risky actions in five minutes after reception of a fraudulent email message with a subject line containing the keyword "important." Since the likelihood is as high as 80%, the message of recipient A has to be deleted earlier than other recipients'. Nevertheless, the above-noted overall risk level of recipient A is only 0.08, which is the same as the other recipients' risk levels. This is because recipient A has low risks in other aspects than the subject keywords.

Different combinations of aspects may result in different conclusions about risk levels as will be described below. Suppose, for example, that recipient C has received eight messages numbered from No. 1 to No. 8. Five messages No. 1 to No. 5 contain a keyword "important" in their subject lines, but the other three do not. Five messages No. 4 to No. 8 are sent from outside the recipient's organization, while the other messages are from within the organization. Note that it is only the message No. 4, out of those eight messages, that recipient C has done a risky action in the first five minutes after its reception. This message No. 4 contains a keyword "important" and is sent from an outside entity.

In the present context, the execution ratio for messages containing "important" is only 0.2 (one message out of five). However, the execution ratio for messages containing "important" and sent from "outside" is 0.5 (one message out of two). The latter fact suggests that a received message has to be deleted from the mailbox of recipient C as soon as possible when the message contains "important" in its subject line and its source address is outside the organization of recipient C. This means that recipient C actually has a higher risk level than others. However, such a conclusion would not be brought by simply multiplying together the risk levels of different aspects.

To address the problem discussed above, the third embodiment proposes to delete received email messages of a particular user in preference to other users when that particular user exhibits a particularly high risk level in some individual aspects, and when the received messages satisfy the conditions of those aspects. The third embodiment disregards other aspects of risk levels in such cases.

For example, the mail deletion unit 150 may set a threshold for each individual aspect of risk levels. The mail deletion unit 150 then creates a black list of risky users by comparing each user's execution ratio of risky actions with a corresponding threshold. For example, a black list may be created for each aspect such as email content and time ranges. More specifically, the action pattern database 140 contains data describing each user's probability (execution ratio) of risky actions in the first five-minute period after reception of email. Note that the probability may vary with the conditions that the received message satisfies. The mail deletion unit 150 analyzes this action pattern database 140 to extract the users whose risk levels exceed a threshold in a certain condition, and registers them in a memory by producing a black list for that condition. In other words, this black list enumerates risky users who tend to quickly act on an email message in a particular condition. The mail deletion unit 150 prepares a plurality of such black lists for different conditions.

As an alternative to the use of thresholds, relative risk levels between users may be evaluated, so that a black list is created by collecting users with relatively high risk levels. For example, the users may be sorted in descending order of risk levels, and a certain top percentage of the user population may be registered in a black list.

Figure 23:
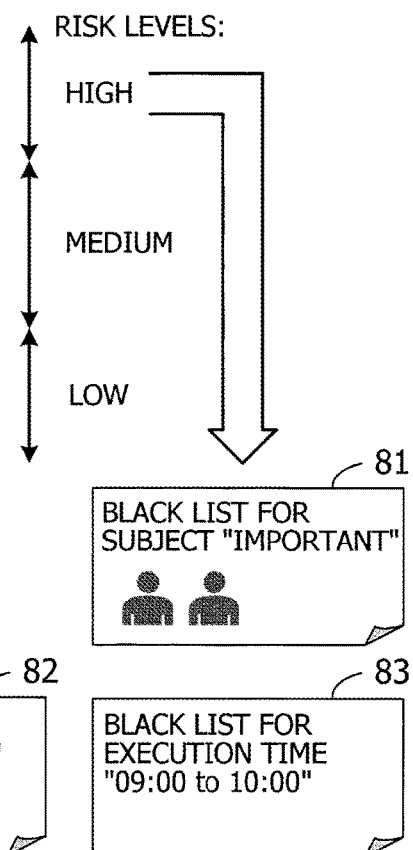
FIG. 23 illustrates an example of producing a black list.

FIG. 23 illustrates an example of producing a black list. Here the mail deletion unit 150 produces a black list for the condition that a keyword "important" is contained in the message subject line. Based on the action pattern database 140, the mail deletion unit 150 compares the users with each other in terms of execution ratios of risky actions that they perform in the first five minutes after reception of messages that meet the noted condition. The users indicating higher execution ratios are classified as high-risk users and thus registered in a black list 81. The black list 81 compiled in this way enumerates the users who tend to quickly open email messages when they see the keyword "important" in the subject line.

The mail deletion unit 150 may further produce a number of black lists 82, 83, . . . on the basis of other various conditions. For example, one black list 82 is produced for the condition that a keyword "urgent" is contained in the message subject line. Another black list 83 is produced for the condition that the execution time of a risky action is in a period of "09:00 to 10:00." The latter black list 83 may be used to find risky users in the case where the received fraudulent email message has a reception timestamp that falls in the time range from 09:00 to 10:00.

In the way described above, the third embodiment produces black lists 81, 82, 83, in preparation for determining the order of users. These black lists are used to give a higher priority to users who exhibit a high risk level in particular aspects even through they are not risky in other aspects. The raised priority permits quick deletion of fraudulent messages received by those users.

The next section will now describe a variation in which a plurality of conditions are combined to determine an execution ratio. Referring back to FIG. 22, recipient C appears to be not risky in any individual condition of execution ratios, but he or she might be likely to do risky actions when some particular conditions are met simultaneously. To deal with such cases, the mail deletion unit 150 may be configured to take quick countermeasures when some conditions exceed predetermined thresholds.

Figure 24:
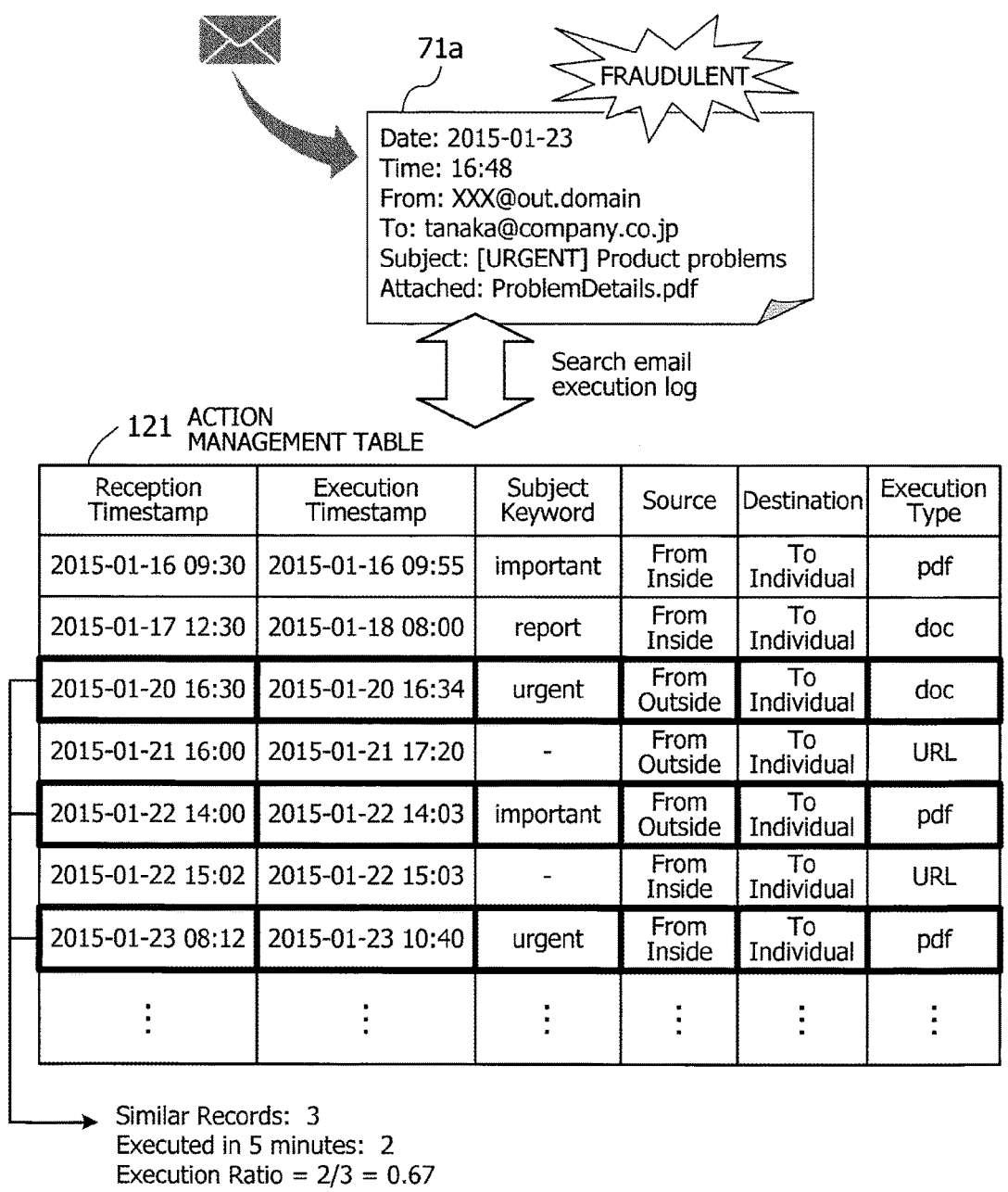
FIG. 24 illustrates an example of how execution ratios are calculated with a combination of multiple conditions.

FIG. 24 illustrates an example of how execution ratios are calculated with a combination of particular conditions. For example, the mail deletion unit 150 searches the action management table 121 for action records that match with a combination of conditions representing similarities to a detected fraudulent email message 71*a*. Some of the found action records may indicate actions executed in the first five minutes after email reception, and the mail deletion unit 150 calculates the execution ratio of such actions. The noted search method for the action management table 121 seeks action records that have a close resemblance to the detected fraudulent email message 71*a*.

In the example of FIG. 24, the mail deletion unit 150 seeks action records that match with the fraudulent email message 71*a* in at least three fields out of the execution timestamp, subject keyword, source, destination, and execution type fields of the action management table 121. For example, the fraudulent email message 71*a* was received at 16:48. Regarding execution timestamp, the mail deletion unit 150 finds a match if the action record has a reception timestamp in the range of 16:00 to 17:00. In the example of FIG. 24, three action records are extracted as being similar to the fraudulent email message 71*a*, of which two records indicate actions executed in the first five minutes after email reception. The execution ratio is thus calculated to be 0.67. The mail deletion unit 150 uses this execution ratio as the risk level of the user corresponding to the illustrated action management table 121.

Some users may exhibit different execution ratios depending on the combination of conditions. The third embodiment executes the above-described calculation to evaluate risk levels of such users, thus making it possible to determine whose fraudulent email to delete in preference to others.

Several embodiments and their variations have been discussed above. In one aspect of these embodiments, the proposed techniques make it possible to take countermeasures against a class of email messages in an appropriate order.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A mail processing server comprising:
    a memory configured to store operation log data recording operations that a plurality of users performed on received email messages, the operation log data including records of the email messages, the records each containing a reception timestamp indicating when an email message was received, an action timestamp indicating when a user executed a risky action on the email message, and a user name indicating who executed the risky action; and
    a processor configured to perform a procedure including:
    producing, upon detection of a fraudulent email message that causes an undesired problem and is addressed to a plurality of destination users, priority data that describes priorities of individual destination users specified in the fraudulent email message, based on the operation log data in the memory, wherein the producing includes giving a priority to each of the destination users, the priority having a value that increases with a decrease in a period from reception of an email message addressed to the destination user to execution, by the destination user, of a risky action on the email message addressed to the destination user; and
    deleting the fraudulent email message from mailboxes of the destination users in descending order of the priorities of the destination users.

2. The mail processing server according to claim 1, wherein the procedure further includes:
    transmitting a message to the destination users in descending order of the priorities of the destination users, the message indicating the detection of the fraudulent email message.

3. The mail processing server according to claim 1, wherein the procedure further includes:

investigating terminal devices of the destination users in descending order of the priorities of the destination users, to determine whether the fraudulent email message has been downloaded to any of the terminal devices; and commanding the terminal device that has downloaded the fraudulent email message to delete the downloaded fraudulent email message.

4. The mail processing server according to claim 1, wherein the producing priority data includes:

extracting a subset of the email messages that shares a characteristic property with the fraudulent email message; and giving successively lower priorities to the destination users sorted in ascending order of times taken from reception of the subset of the email messages to execution of a specified action on the subset of the email messages.

5. The mail processing server according to claim 4, wherein the producing priority data includes:

calculating, based on the operation log data, an execution ratio representing a ratio of specific actions performed in a specific time after email reception, the execution ratio being calculated for the individual destination users and for each of a plurality of characteristic properties of the email messages; and giving priorities to the individual destination users, based on the execution ratios calculated about the characteristic properties of the fraudulent email message.

6. A mail processing method comprising:

producing by a processor, upon detection of a fraudulent email message that causes an undesired problem and is addressed to a plurality of destination users, priority data that describes priorities of individual destination users specified in the fraudulent email message, based on operation log data recording operations that a plurality of users performed on received email messages, the operation log data including records of the email messages, the records each containing a reception timestamp indicating when an email message was received, an action timestamp indicating when a user executed a risky action on the email message, and a user name indicating who executed the risky action, wherein the producing includes giving a priority to each of the destination users, the priority having a value that increases with a decrease in a period from reception of an email message addressed to the destination user to execution, by the destination user, of a risky action on the email message addressed to the destination user; and deleting the fraudulent email message from mailboxes of the destination users in descending order of the priorities of the destination users.

7. A non-transitory computer-readable storage medium storing therein a program that causes a computer to perform a procedure comprising:

producing, upon detection of a fraudulent email message addressed to a plurality of destination users, priority data that describes priorities of individual destination users specified in the fraudulent email message, based on operation log data recording operations that a plurality of users performed on received email messages, the operation log data including records of the email messages, the records each containing a reception timestamp indicating when an email message was received, an action timestamp indicating when a user executed a risky action on the email message, and a user name indicating who executed the risky action, wherein the producing includes giving a priority to each of the destination users, the priority having a value that increases with a decrease in a period from reception of an email message addressed to the destination user to execution, by the destination user, of a risky action on the email message addressed to the destination user; and deleting the fraudulent email message from mailboxes of the destination users in descending order of the priorities of the destination users.

* * * * *